US012747815B2

(12) United States Patent
Williams

(10) Patent No.: US 12,747,815 B2
(45) Date of Patent: Sep. 29, 2026

(54) FLUID COUPLINGS

(71) Applicant: Colder Products Company, Roseville, MN (US)

(72) Inventor: Randall S. Williams, Minneapolis, MN (US)

(73) Assignee: Colder Products Company, Roseville, MN (US)

( * ) Notice: Subject to any disclaimer, the term of this patent is extended or adjusted under 35 U.S.C. 154(b) by 0 days.

(21) Appl. No.: 19/018,734

(22) Filed: Jan. 13, 2025

(65) Prior Publication Data

US 2025/0230888 A1 Jul. 17, 2025

Related U.S. Application Data

(60) Provisional application No. 63/621,009, filed on Jan. 15, 2024.

(51) Int. Cl.
*F16L 37/36* (2006.01)
*F16K 31/50* (2006.01)

(52) U.S. Cl.
CPC ............ *F16L 37/36* (2013.01); *F16K 31/508* (2013.01); *Y10T 137/87925* (2015.04)

(58) Field of Classification Search
CPC ............ A61M 2039/226; F16K 31/508; F16K 31/524; F16K 31/52408; F16K 31/52416; F16K 31/528; F16L 37/086; F16L 37/36; F16L 37/32; Y10T 137/87925
USPC .......................................................... 137/614
See application file for complete search history.

(56) References Cited

U.S. PATENT DOCUMENTS

| | | | | | |
|---|---|---|---|---|---|
| 2,737,401 | A * | 3/1956 | Lindsay | ................ | F16L 37/107 137/553 |
| 3,865,411 | A | 2/1975 | Rowe | | |
| 4,354,490 | A | 10/1982 | Rogers | | |
| 5,884,648 | A * | 3/1999 | Savage | ................... | F16L 37/36 137/614.04 |
| 5,975,491 | A * | 11/1999 | Mann | ....................... | F16L 37/30 137/614.05 |
| 6,962,321 | B1 * | 11/2005 | Savage | ................ | B65D 77/067 137/614.04 |
| 7,121,556 | B2 | 10/2006 | Barth | | |
| 8,439,838 | B2 | 5/2013 | Mogensen | | |

(Continued)

FOREIGN PATENT DOCUMENTS

| | | |
|---|---|---|
| CN | 109999333 | 7/2019 |
| FR | 2958365 | 10/2011 |
| WO | WO 2020/124245 | 7/2020 |

OTHER PUBLICATIONS

International Search Report and Written Opinion in International Appln. No. PCT/US2025/011414, mailed on Mar. 27, 2025, 9 pages.

*Primary Examiner* — Kenneth J. Rinehart
*Assistant Examiner* — Jonathan J Waddy
(74) *Attorney, Agent, or Firm* — Fish & Richardson P.C.

(57) ABSTRACT

Fluid handling couplings can be configured for use in sterile fluid systems. For example, this document describes fluid handling couplings that are sterilizable, genderless, that include manually openable valves, and that are configured for single-use aseptic fluid handling usage. The manually openable valve can include a screw thread segment and a plug portion. The plug portion can block fluid flow through the fluid handling coupling when the valve is in its closed configuration.

16 Claims, 23 Drawing Sheets

(56) References Cited

U.S. PATENT DOCUMENTS

| | | | | |
|---|---|---|---|---|
| 8,690,120 | B2 * | 4/2014 | Hartnett | F04B 39/0005 604/533 |
| 9,726,308 | B2 | 8/2017 | Williams | |
| 2002/0148514 | A1 | 10/2002 | Taneya et al. | |
| 2003/0030272 | A1 | 2/2003 | Johnson | |
| 2005/0016620 | A1 | 1/2005 | Proulx et al. | |
| 2008/0217915 | A1 | 9/2008 | Arthun et al. | |
| 2008/0277878 | A1 | 11/2008 | Arthun | |
| 2010/0230950 | A1 | 9/2010 | Williams | |
| 2012/0138178 | A1 * | 6/2012 | Koo | F16L 37/36 251/149.7 |
| 2013/0289517 | A1 | 10/2013 | Williams et al. | |
| 2015/0028586 | A1 | 1/2015 | Gerst et al. | |
| 2016/0053927 | A1 | 2/2016 | Whitaker | |
| 2017/0284584 | A1 | 10/2017 | Kesselaar | |
| 2018/0000695 | A1 | 1/2018 | Stroup | |
| 2018/0304061 | A1 | 10/2018 | Sautereau | |
| 2020/0386330 | A1 * | 12/2020 | Stanton | F16K 31/44 |
| 2021/0062946 | A1 * | 3/2021 | Gerst | F16L 33/035 |
| 2021/0330955 | A1 * | 10/2021 | Suwito | A61M 5/16813 |
| 2022/0186841 | A1 * | 6/2022 | Pereira | A61M 39/22 |
| 2022/0243848 | A1 * | 8/2022 | Truong | F16L 37/0841 |
| 2022/0252194 | A1 * | 8/2022 | Benson | F16L 37/30 |
| 2022/0381384 | A1 | 12/2022 | Coscia | |
| 2023/0121092 | A1 * | 4/2023 | Casura | F16L 37/23 137/614.03 |
| 2023/0121701 | A1 * | 4/2023 | Casura | F16L 37/0841 285/305 |
| 2023/0213129 | A1 | 7/2023 | Peabody et al. | |
| 2025/0092974 | A1 * | 3/2025 | Jang | F16K 3/0227 |

* cited by examiner

FLUID COUPLINGS

CROSS-REFERENCE TO RELATED APPLICATIONS

This application claims the benefit of U.S. Provisional Application Ser. No. 63/621,009 filed Jan. 15, 2024. The disclosure of the prior application is considered part of the disclosure of this application and is incorporated in its entirety into this application.

BACKGROUND

1. Technical Field

This document relates to fluid handling couplings.

2. Background Information

Fluid handling components such as fluid couplings allow fluid communication between two or more components. Some fluid couplings include features that allow male and female components (or two genderless fluid couplings) to be quickly connected and may include one or more internal valve components that selectively block or allow flow of fluid through the coupling.

SUMMARY

This document describes fluid coupling devices for fluid systems and methods. In some embodiments, the fluid coupling devices can be implemented as single-use, aseptic fluid coupling connection devices. In the context of this disclosure, the term “fluid” means any substance that can be made to flow including, but is not limited to, liquids, gases, granular or powdered solids, mixtures or emulsions of two or more fluids, suspensions of solids within liquids or gases, gels, vapors, steam, mists, etc., without limitation.

In one aspect, this disclosure is directed to a fluid coupling device that includes a main body defining a longitudinal axis. The main body has a front face. The fluid coupling device also includes a post extending parallel to the longitudinal axis, and a post receptacle. The fluid coupling device also includes a seal coupled to the main body around the longitudinal axis. A portion of the seal protrudes from the front face of the main body. The fluid coupling device also includes a removable membrane releasably attached to the front face of the main body and covering the portion of the seal protruding from the front face of the main body. The fluid coupling device also includes a protective cover releasably engaged with the post and post receptacle of the main body. Two layers of the removable membrane are captured between the protective cover and the front face of the main body.

Such a fluid coupling device may optionally include one or more of the following features. The seal may have an hourglass cross-sectional shape. The fluid coupling may be genderless such that two of the fluid coupling devices can be coupled to each other. The protective cover may include a pull ring. The pull ring may define an opening configured to receive a finger. The protective cover may include a membrane receiver portion that holds and protects a portion of the removable membrane. The fluid coupling device may also include a valve member and a valve actuator rotatably coupled to the main body. The valve member is reconfigurable between: (i) a first position in which the valve member is engaged with a sealing surface such that no fluid flow path is open through the fluid coupling and (ii) a second position in which the valve member is spaced apart from the seal such that a fluid flow path is open through the fluid coupling. The fluid coupling device also includes a removable membrane releasably attached to the front face of the main body and covering the portion of the seal protruding from the front face of the main body.

In particular embodiments, the fluid coupling devices described herein are single-use devices because, after the two portions of the coupling (also referred to herein as “coupling halves” and/or “connectors”) are connected to each other, the coupled portions are designed to resist uncoupling. For example, such single-use coupling devices are equipped with one or more mechanical components that operate like locks to maintain the two portions of the coupling in the coupled state. Hence, in these particular embodiments, the fluid coupling devices provided herein are structurally configured to be single-use connection devices so that, after the single-use coupling halves have been connected to each other, they cannot be operably disconnected from each other (as such, preserving the sterility or biological integrity of the system/flow path/etc.). However, in some embodiments the fluid coupling devices are designed to be uncoupled/disconnected from each other after having been coupled/connected.

Additionally, in such single-use embodiments or in other embodiments, the fluid coupling devices can be configured as “aseptic” coupling devices in that they can be connected to each other while inhibiting biological contamination from migrating into the flow paths. Such an “aseptic” coupling will also serve to limit the exposure of the fluid to the surrounding environment.

Further, in such single-use embodiments, or other embodiments, the fluid coupling devices can be configured as genderless couplings. That is, the two coupling portions can be designed exactly alike (or substantially alike) so that there is no male or female coupling halves as in many conventional fluid coupling designs.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

Like reference numbers represent corresponding parts throughout.

DETAILED DESCRIPTION

This document describes fluid handling couplings. For example, this document describes fluid handling couplings that are genderless, that include manually openable valves, and that are configured for single-use aseptic fluid handling usage contexts.

As used herein, the term "sterilize" means a process of freeing, to a specified degree, a surface or volume from microorganisms. In example embodiments, the sterility of various components can be achieved using one or more sterilization techniques, including gamma irradiation, E-beam, ethylene oxide (EtO), and/or autoclave technologies. As used herein, the term "aseptic" refers to any process that maintains a sterilized surface or volume.

Figure 1:
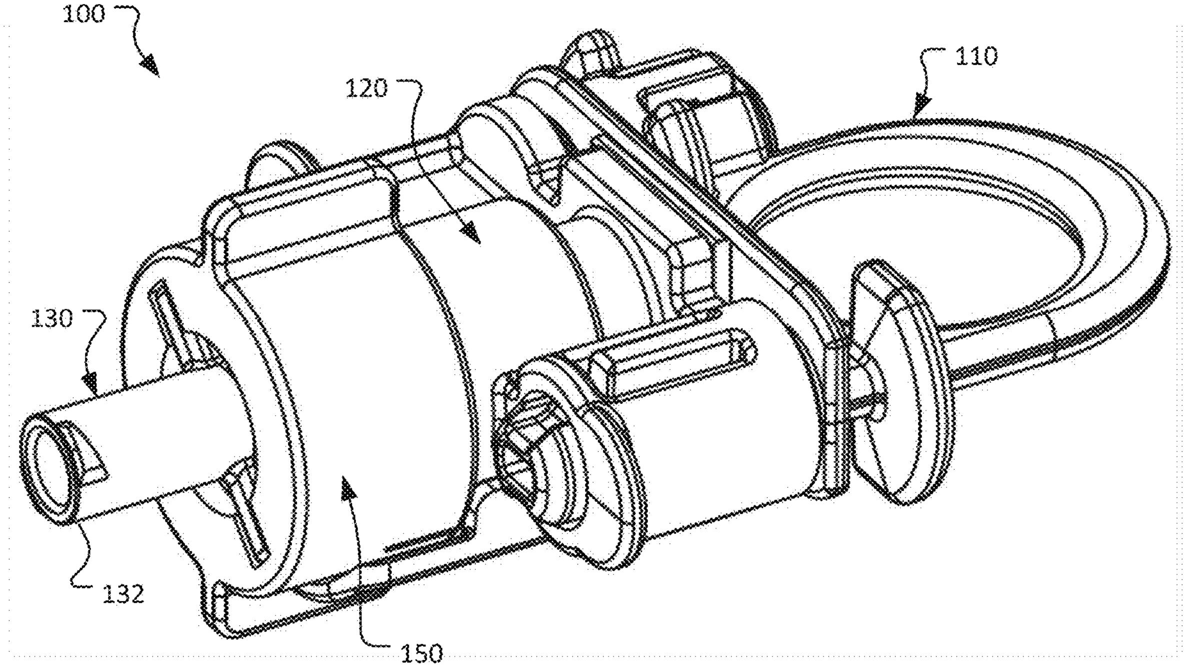
FIG. 1 is a perspective view of an example fluid coupling in accordance with some embodiments provided herein.
Figure 2:
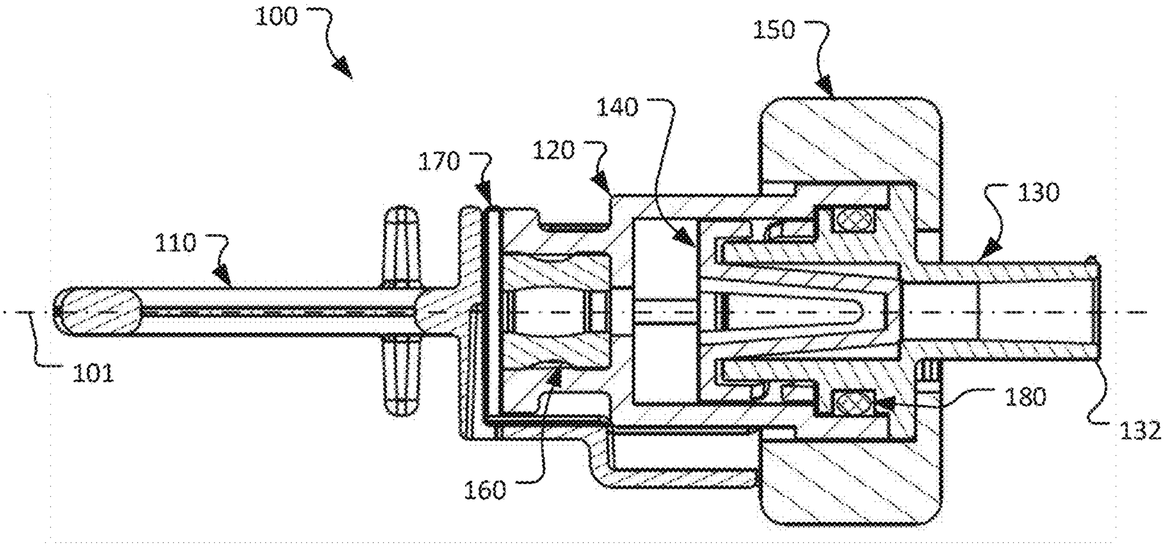
FIG. 2 is a longitudinal cross-section of the fluid coupling of FIG. 1.
Figure 3:
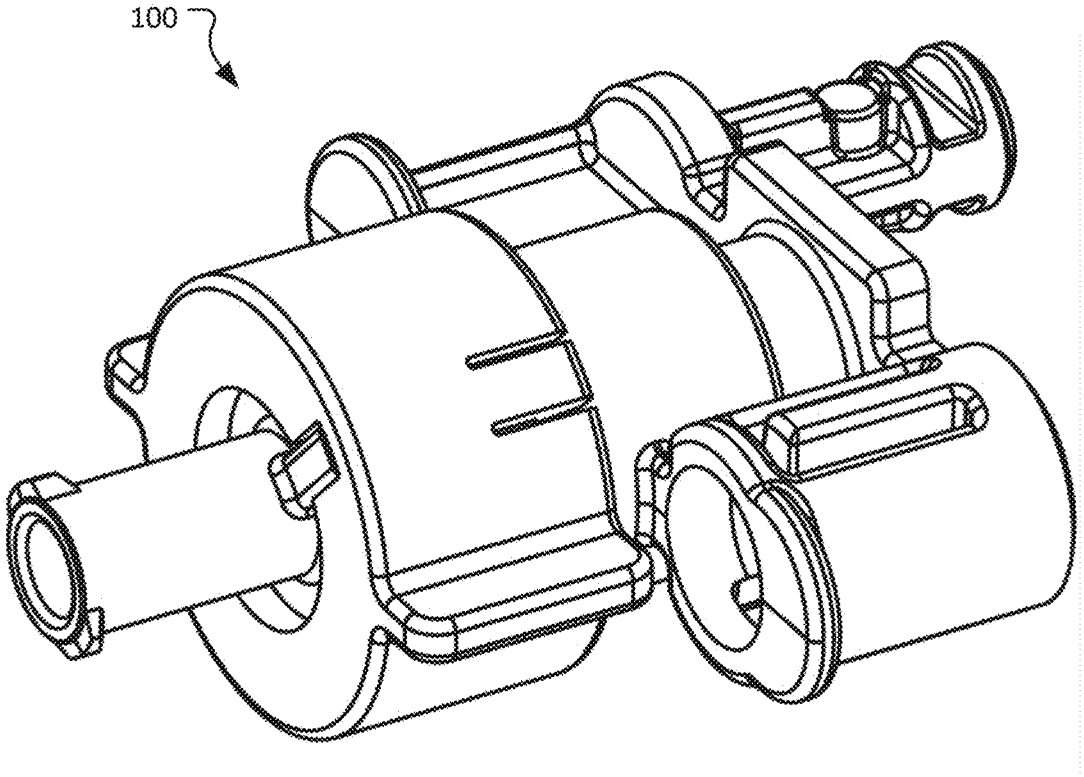
FIGS. 3-6 are additional views of the fluid coupling of FIG. 1 with the protective cover removed.
Figure 4:
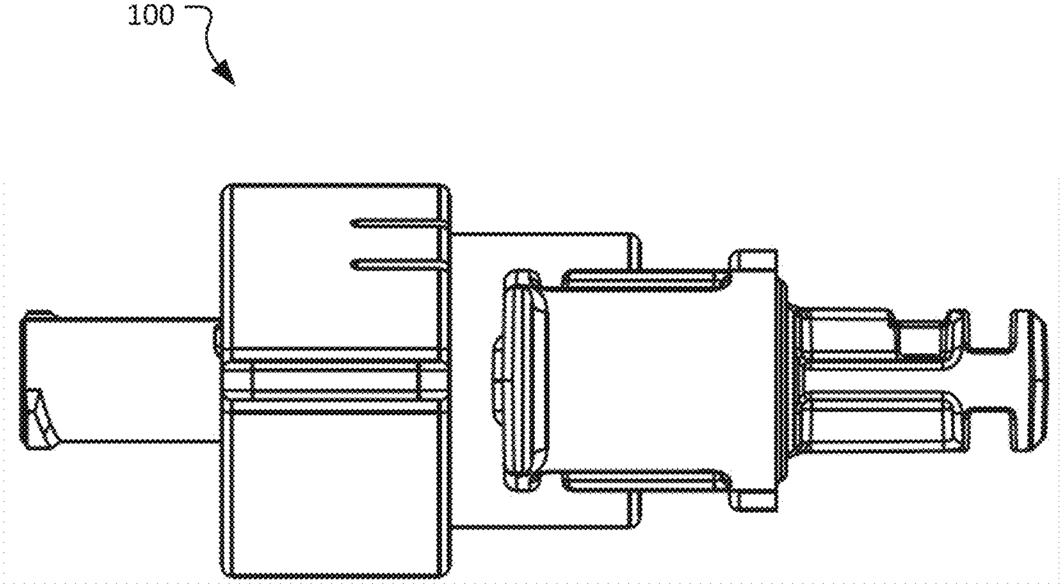
Figure 5:
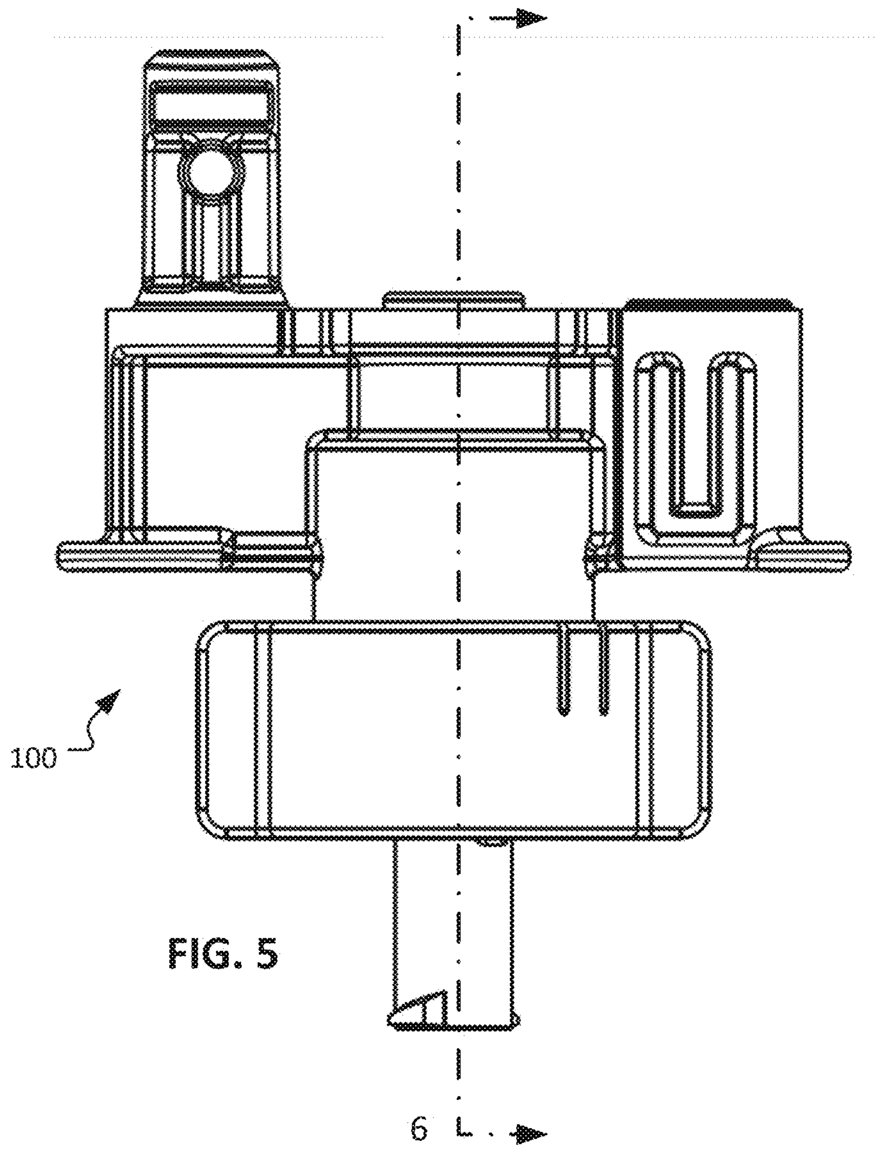
Figure 6:
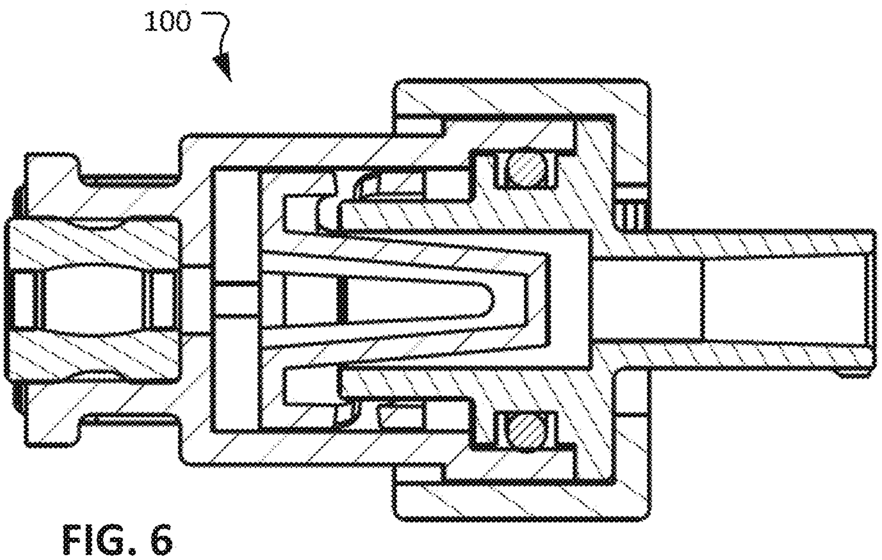

FIGS. 1 and 2 show a fluid coupling device 100 that includes a protective cover 110 engaged with the main body 120 of the fluid coupling device 100. The fluid coupling device 100 defines a longitudinal axis 101. The protective cover 110 is manually removable, and can be separated from the main body 110 as illustrated in FIGS. 3-6.

The protective cover 110 provides protection to a removable membrane member 170 (FIG. 2) that is adhered (e.g., heat welded/sealed, ultrasonic welded, adhered using an adhesive, etc.) to the front face of the main body 110. In some embodiments, the removable membrane member 170 is made of a porous material that allows the passage of gaseous materials (e.g., for sterilization) while preventing the passage of larger materials such as biological contaminants and/or particulate matter. In some embodiments, the removable membrane member 170 (and other removable membrane members described herein) is made of a foil or other suitable flexible materials. The removable membrane member 170 can provide a sterile barrier to prevent contamination of the inner fluid-contacting surfaces of the main body 120. In some embodiments, the fluid coupling 100 can be provided to end users in a sterile condition, or in a condition ready for sterilization.

The materials from which one or more of the components of the fluid coupling device 100 (and other fluid couplings described herein) can be made include thermoplastics. In particular embodiments, the materials from which the components of the fluid coupling device 100 are made of are thermoplastics, such as, but not limited to, acetal, polycarbonate, polysulfone, polyether ether ketone, polysulphide, polyester, polyvinylidene fluoride (PVDF), polyethylene, polyphenylsulfone (PPSU; e.g., Radel®), acrylonitrile butadiene styrene (ABS), polyetherimide (PEI; e.g., Ultem®), polypropylene, polyphenylene, polyaryletherketone, and the like, and combinations thereof. In some embodiments, the thermoplastics can include one or more fillers such as, but not limited to, glass fiber, glass bead, carbon fiber, talc, etc.

In some embodiments, the materials from which one or more of the components of the fluid coupling device 100 (and other fluid couplings described herein) are made of include metals such as, but not limited to copper, stainless steel, brass, aluminum, plated steel, zinc alloys, and the like. In particular embodiments, the fluid coupling device 100 is metallic-free.

In some embodiments, as described further below, the fluid coupling device 100 can include one or more seal members (such as the seal 160 and a seal 180). In some embodiments, the seal members of the fluid coupling device 100 (and the other fluid couplings described herein) can comprise materials such as, but not limited to, silicone, fluoroelastomers (FKM), ethylene propylene diene monomer (EPDM), thermoplastic elastomers (TPE), buna, buna-N, thermoplastic vulcanizates (TPV), and the like. The cross-sectional shape of such seal members can be circular, D-shaped, X-shaped, hourglass shaped, square, rectangular, U-shaped, multi-lobed, L-shaped, V-shaped, and the like, or any other suitable shape, without limitation.

Figure 7:
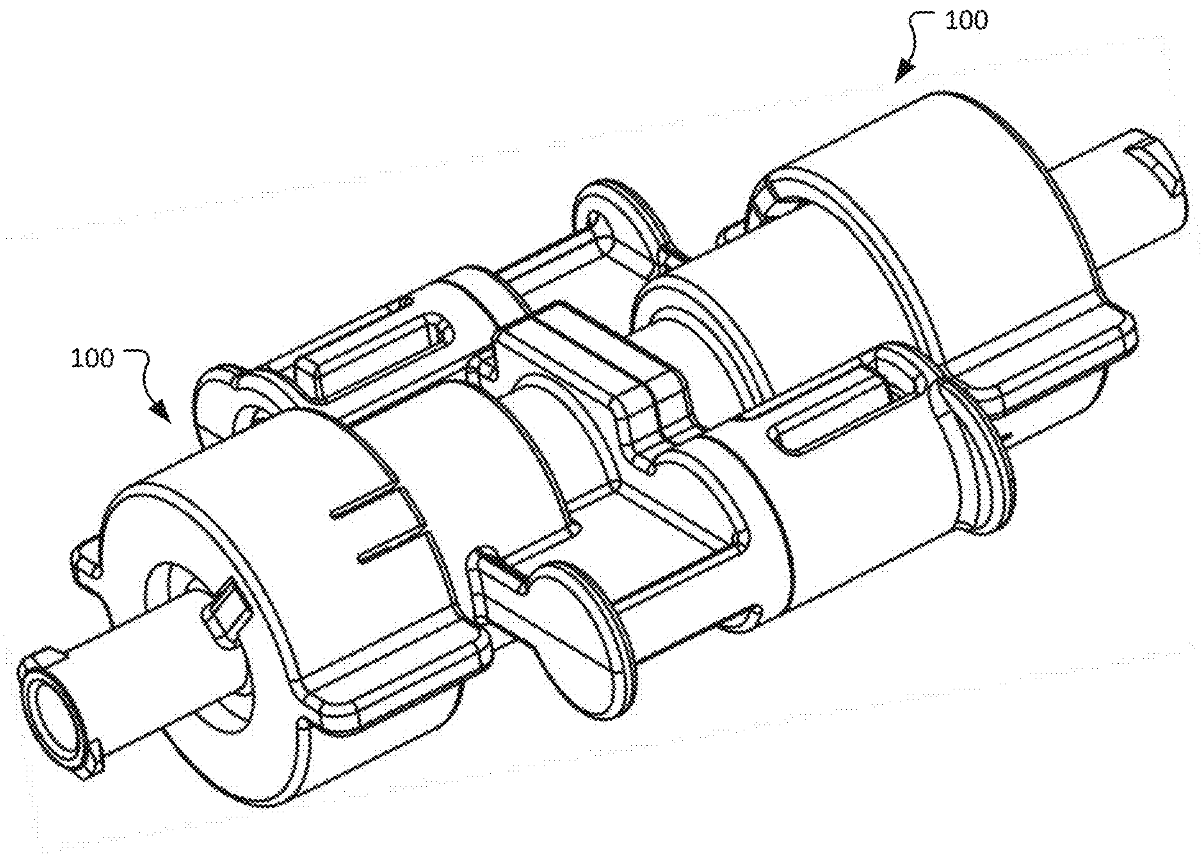
FIGS. 7-9 show two of the fluid couplings of FIGS. 3-6 in a coupled arrangement.
Figure 8:
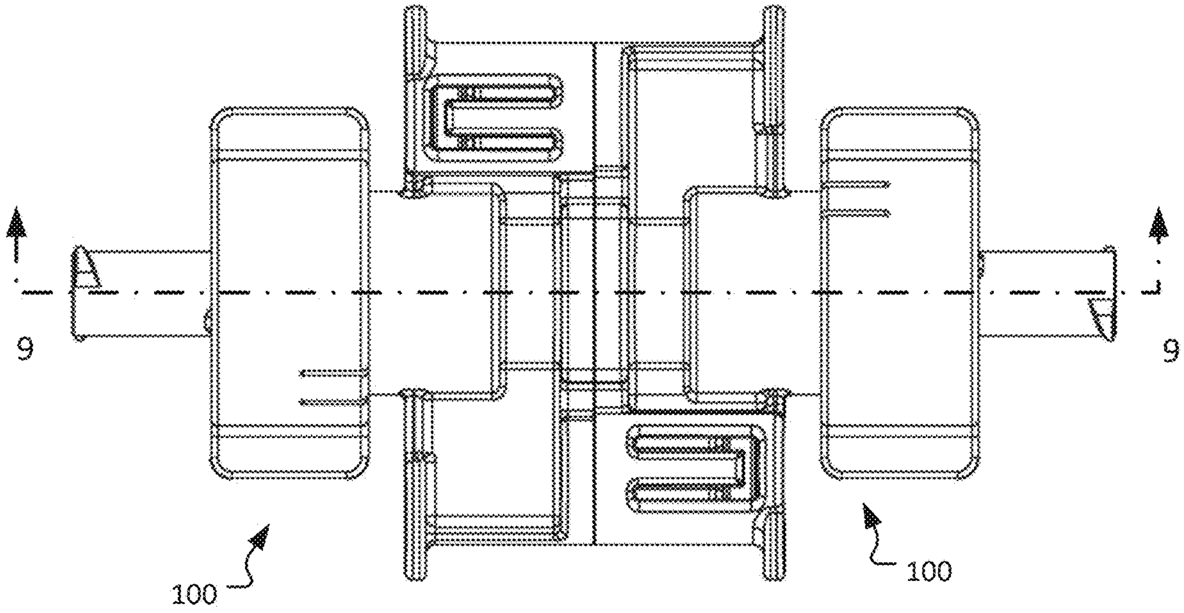
Figure 9:
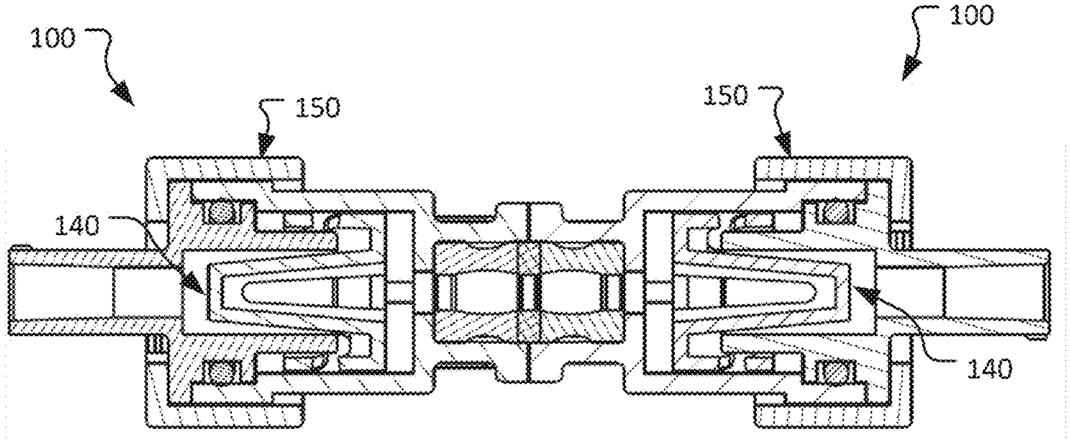
Figure 10:
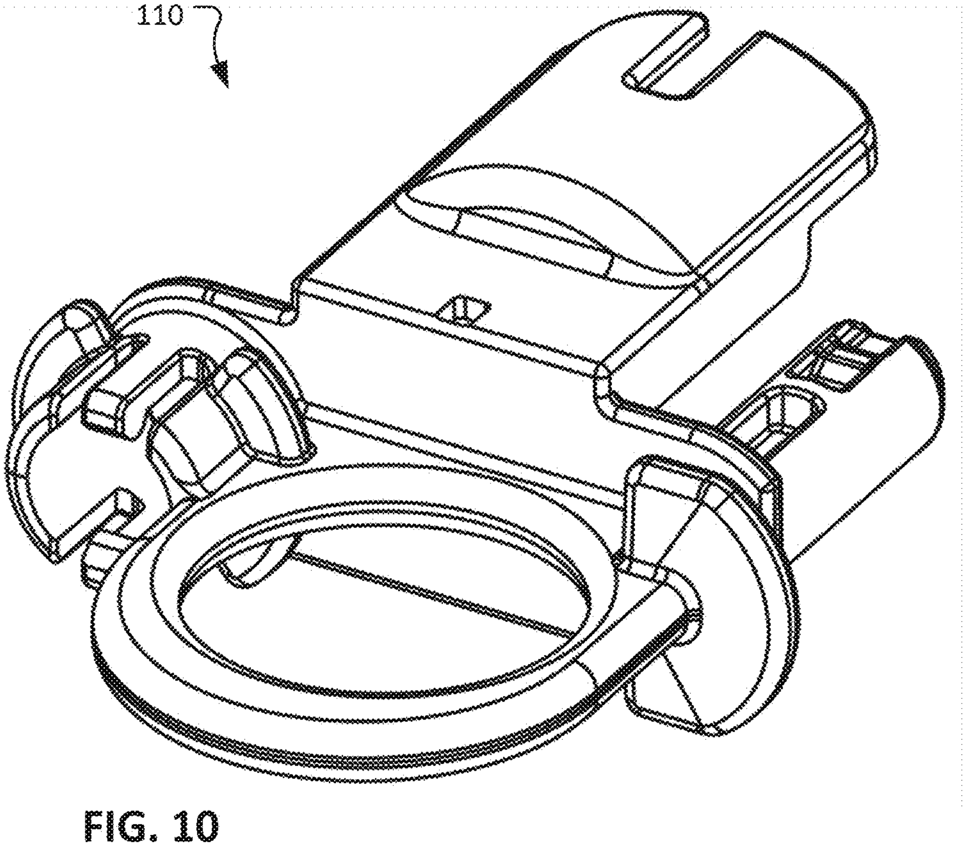
FIGS. 10 and 11 illustrate the protective cover of the fluid coupling of FIG. 1.
Figure 11:
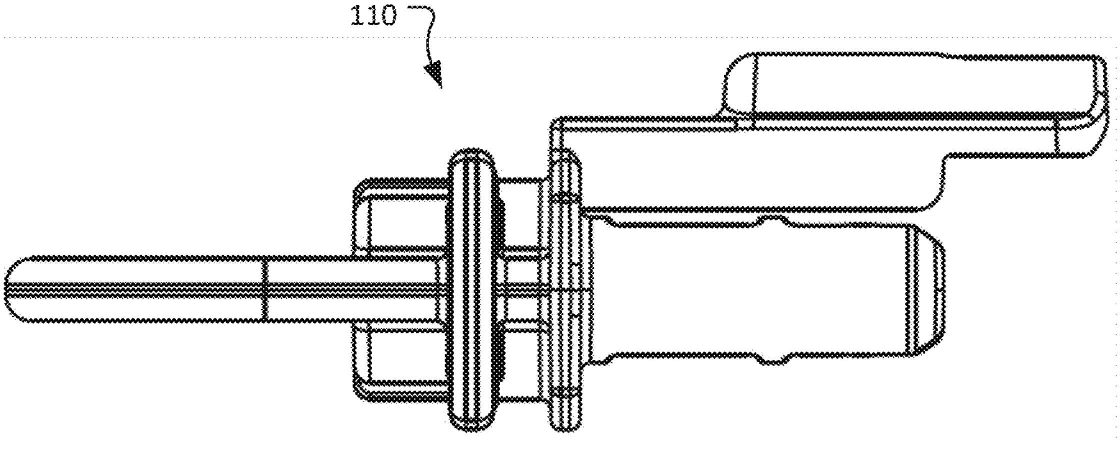
Figure 12:
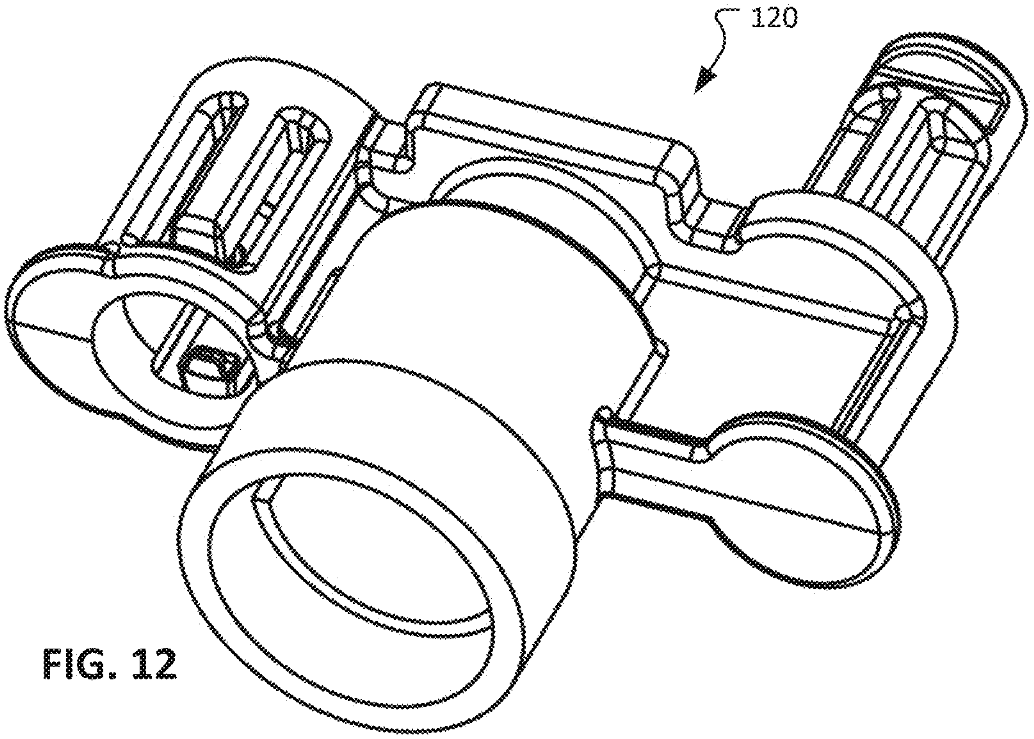
FIGS. 12 and 13 illustrate the main body of the fluid coupling of FIG. 1.
Figure 13:
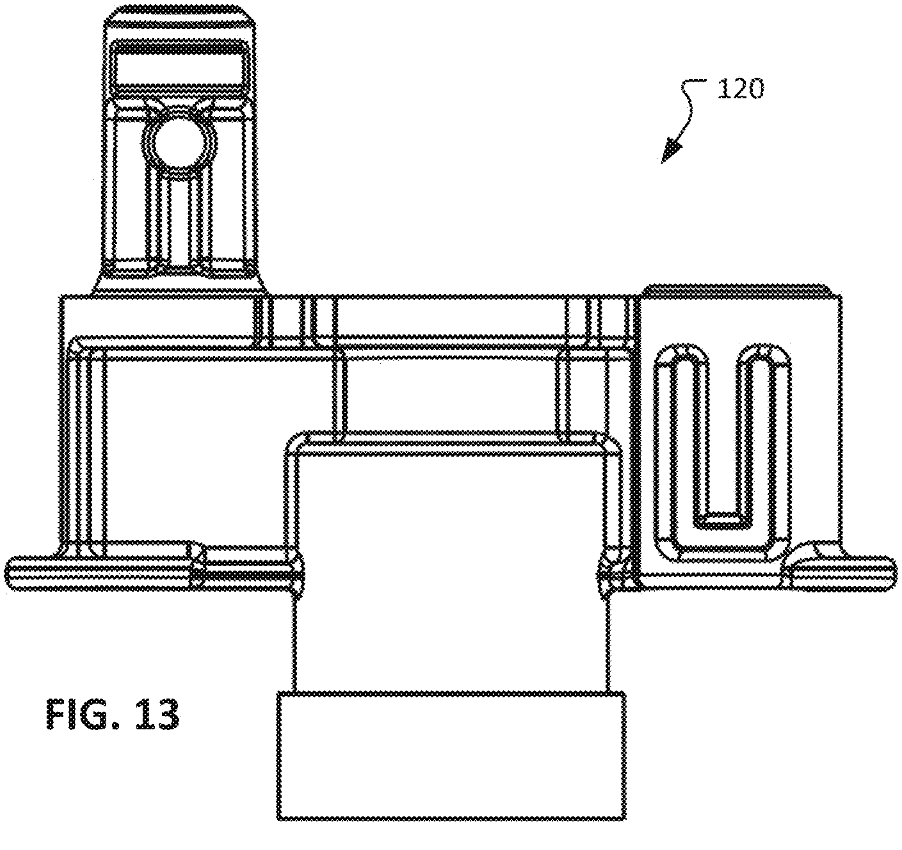
Figure 14:
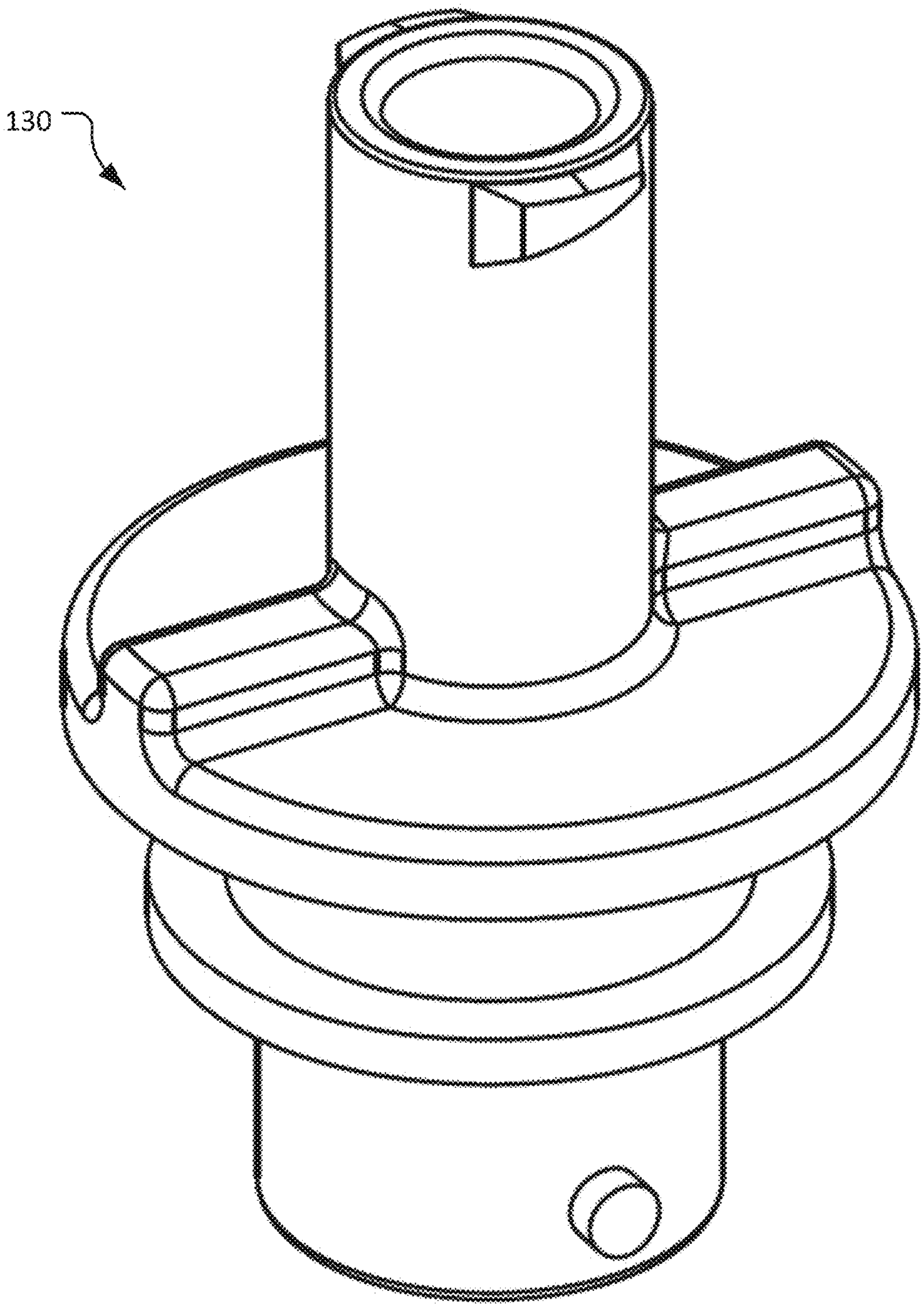
FIG. 14 illustrates the termination cylinder of the fluid coupling of FIG. 1.
Figure 15:
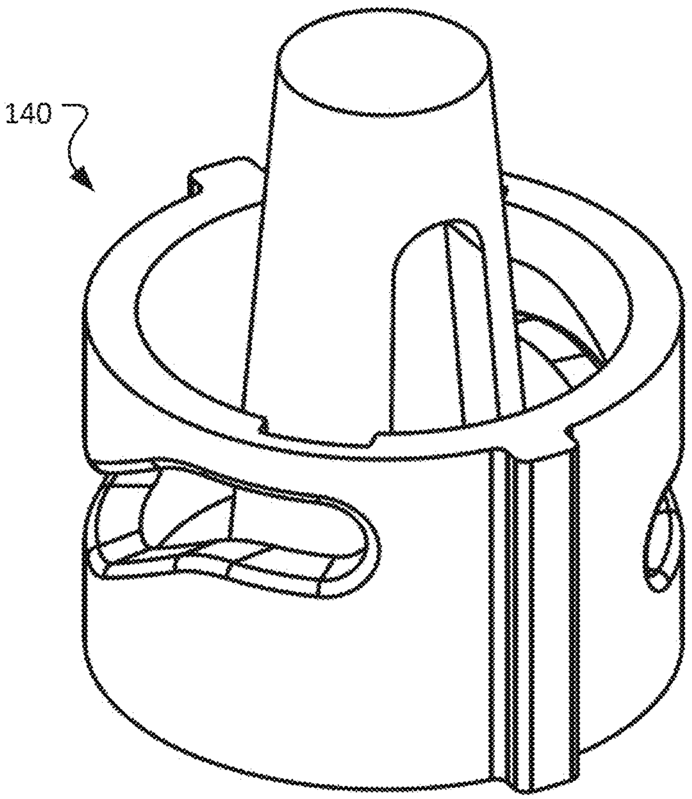
FIGS. 15-17 illustrate the valve member of the fluid coupling of FIG. 1.
Figure 16:
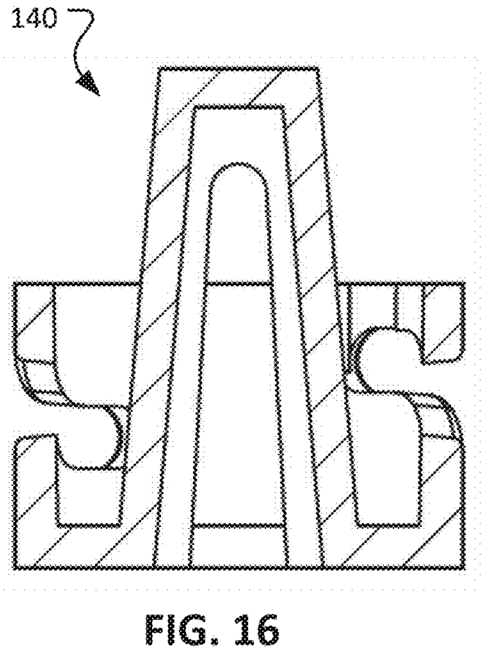
Figure 17:
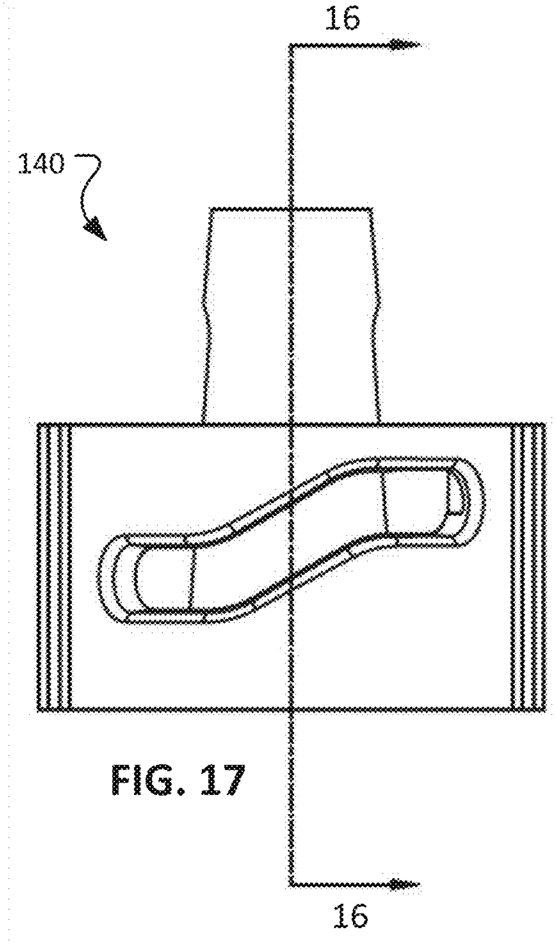
Figure 18:
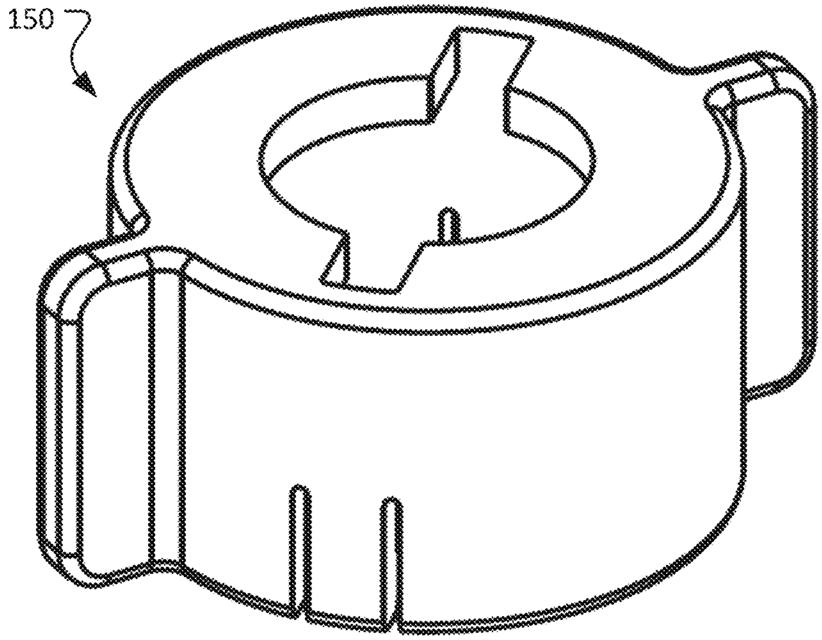
FIGS. 18-21 illustrate the valve actuator of the fluid coupling of FIG. 1.
Figure 20:
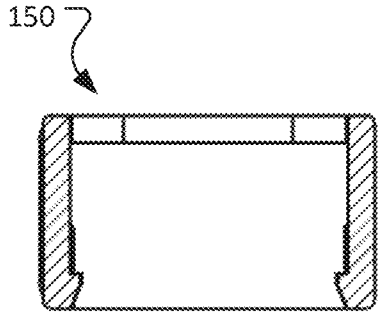
Figure 19:
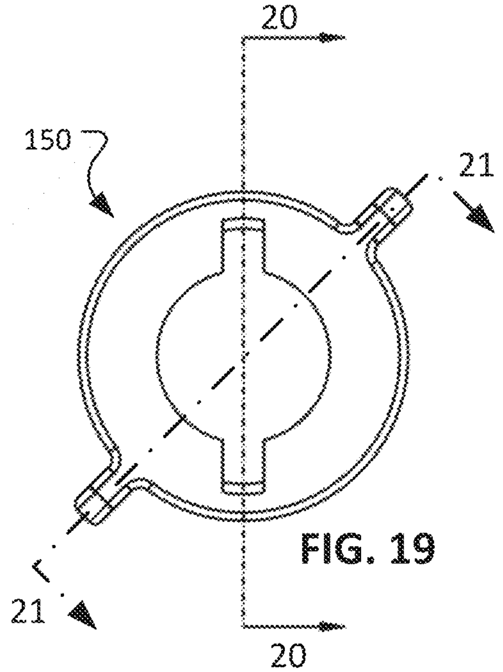
Figure 21:
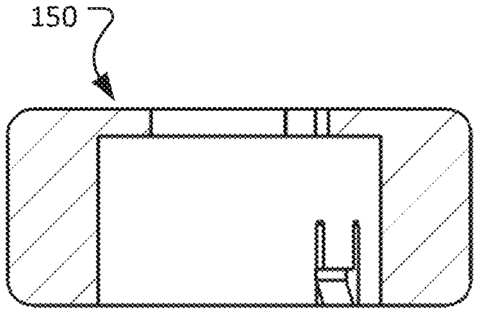
Figure 22:
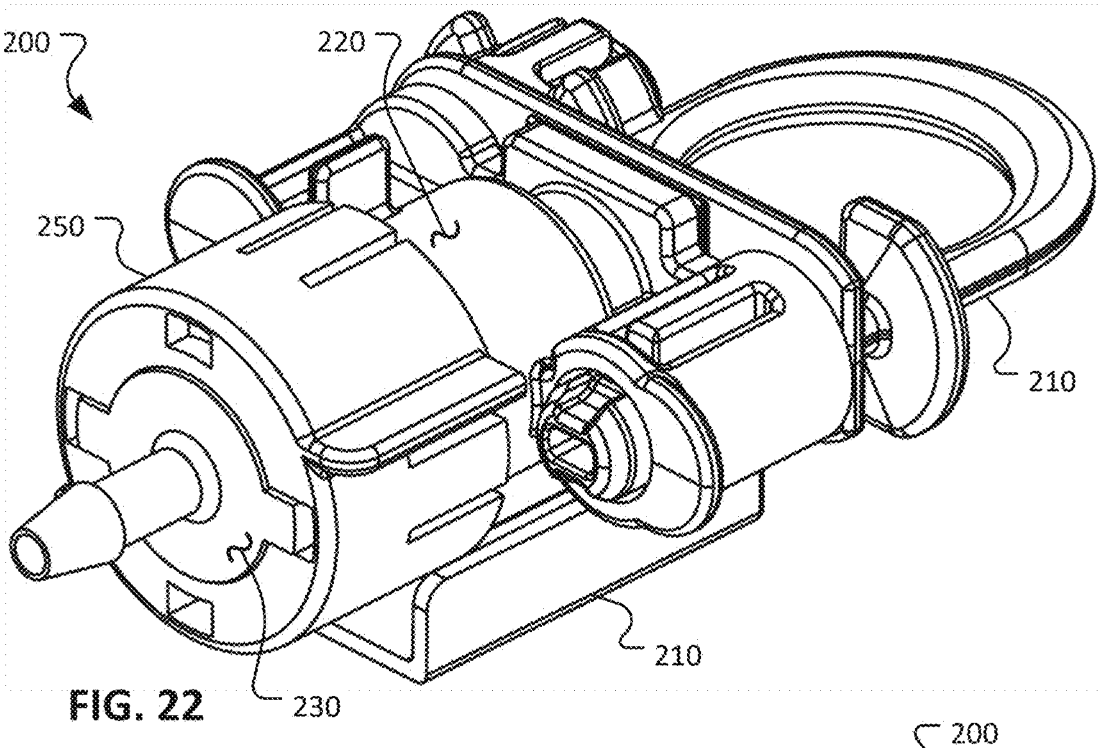
FIG. 22 is a perspective view of another example fluid coupling in accordance with some embodiments provided herein.
Figure 23:
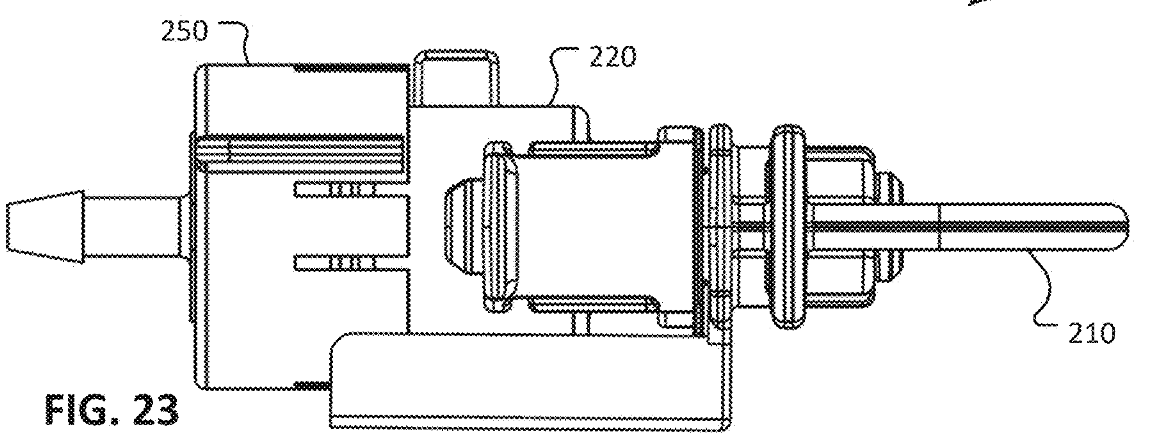
FIG. 23 is a side view of the fluid coupling of FIG. 22.

FIGS. 7-9 show two of the fluid coupling devices 100 in a coupled arrangement with the removable membrane members 170 removed from the main bodies 110. In this embodiment, the fluid coupling device 100 (and the other fluid couplings described herein) is genderless (meaning that two of the fluid coupling devices 100 can be coupled to each other, and that there are no 'male' and 'female' coupling devices). In this configuration, the main bodies 120 are latched together. In this arrangement, there is compression between the seals 160.

The fluid coupling devices 100 include termination cylinder 130 (FIGS. 1 and 2) that is coupled to the main body 120. The termination cylinder 130 includes a termination 132. While in the depicted configuration the termination 132 is a luer fitting, any other suitable type of termination can be used such as, but not limited to, a hose barb, a compression fitting, a quick disconnect, a sanitary fitting, hydraulic quick connection, a solder connection, a welded connection, a threaded connection (e.g., straight thread or pipe thread), and so on, without limitation (and other fluid couplings described herein). Such connections can be straight (as depicted) or in another arrangement such as, but not limited to, a 90° elbow arrangement, a 45° elbow, a straight fitting, a Tee fitting, a Y-fitting, and so on. In some embodiments, the fluid coupling devices 100 can be configured to be fluidly coupled with a fluid conduit such as, but not limited to, a tube, pipe, a manifold, and the like, without limitation. In some embodiments, fluid coupling devices 100 can be configured to be fluidly coupled with a bag or other type of container.

FIGS. 7-9 shows the membranes 170 removed from the main bodies 120. In order to maintain sterility of the fluid couplings 100 (and other fluid couplings described herein), the membranes 170 are not removed until two of the fluid couplings 100 are joined together as shown. This removal can then be performed by a user who manually pulls the membranes 170 transversely away from the main bodies 120. In some embodiments, the membranes 170 are folded and the folds can roll/progress when the membranes 170 are pulled so as to simultaneously peel the two membranes 170 off of the front faces of the main bodies 110. Then, the front faces of the seals 160 abut each other. That is, the two seals 160 are in contact with each other after the membranes 170 are removed. Accordingly, because of the sealing between the two seals 160, the inner fluid contacting surfaces of the main bodies 110 are still prevented from being contaminated.

After removal of the membranes 170, the valves members 140 can then be moved to their open positions by rotation of the valve actuators 150 relative to the main bodies 120. Such rotation of the valve actuators 150 relative to the main bodies 120 longitudinally drive the valve members 140 to open a fluid flow path through the fluid couplings 100. To illustrate this further, see FIG. 2 in which the valve member 140 is in its closed position wherein no fluid flow path is open through the fluid coupling 100. In contrast, see FIG. 9 in which the valve members 140 are in their open positions in which a fluid flow path is open through the fluid couplings 100.

FIGS. 10-21 illustrate the component parts of the fluid coupling 100.

FIGS. 22-36 illustrate another example fluid coupling 200 in accordance with some embodiments provided herein. In the depicted embodiment, the fluid coupling 200 is an aseptic, genderless fluid coupling 200. As described further below, two of the fluid couplings 200 can be joined together in an operative arrangement in a manner that provides a sterile fluid flow path therethrough. Alternatively, the fluid coupling 200 can be joined with a different type of fluid coupling as long as the physical features for joining the couplings together are compatible.

The fluid coupling 200 includes a protective cover 210, a main body 220, a termination member 230, a valve member 240, a valve actuator 250, a seal 260, a membrane 270, and a C-clip 280.

Figure 32:
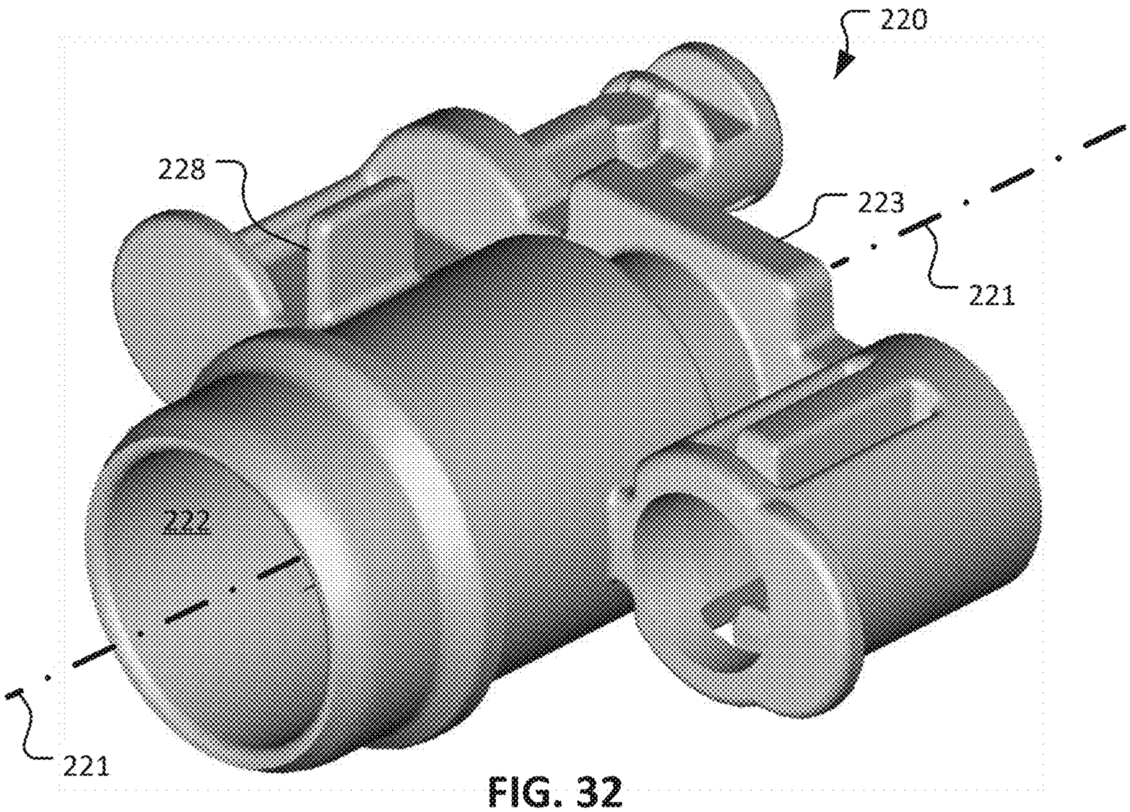
FIG. 32 is a perspective view of an example main body of the fluid coupling of FIG. 22.
Figure 33:
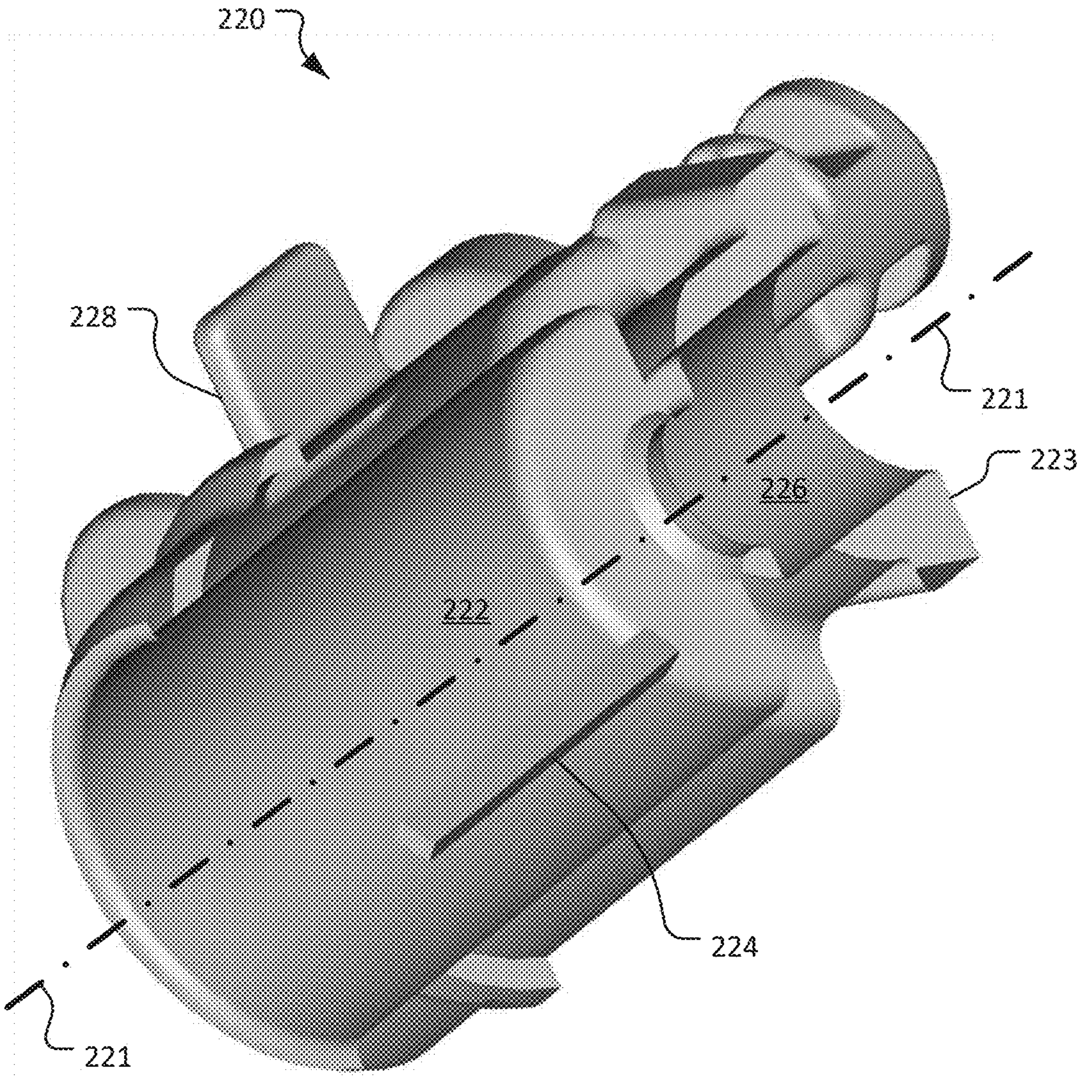
FIG. 33 is a longitudinal cross-section view of the main body of FIG. 32.

As shown in FIGS. 32 and 33, the main body 220 defines a central longitudinal axis 221, an internal space 222 and a seal recess 226. The main body includes a front face 223.

The seal 260 is engaged in the seal recess 226. The seal 260 includes a seal portion disposed within the seal recess 226 and a seal portion projecting from the front face 223. The seal 260 defines a longitudinally-extending central passageway through which fluid can flow when in an operative arrangement.

Figure 24:
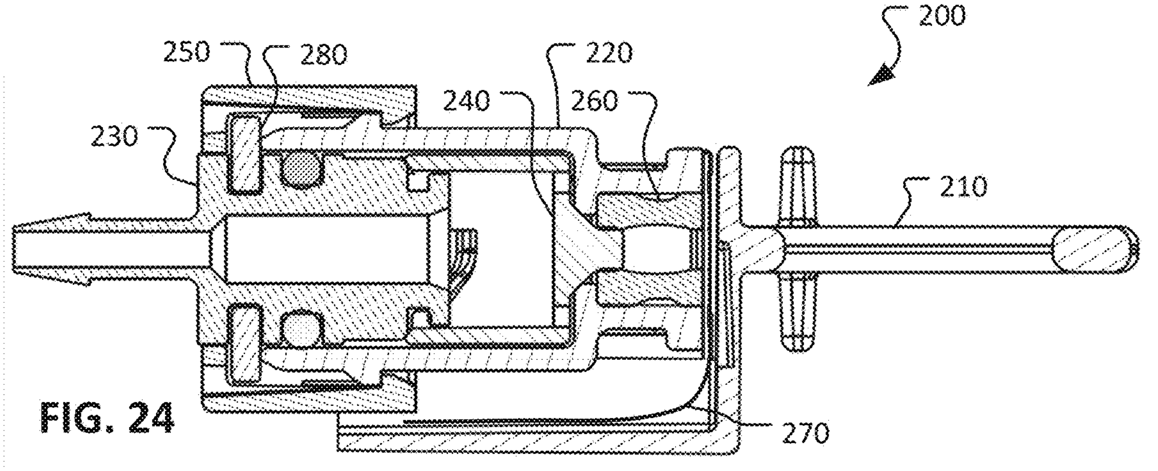
FIG. 24 is a longitudinal cross-section view of the fluid coupling of FIG. 22.
Figure 25:
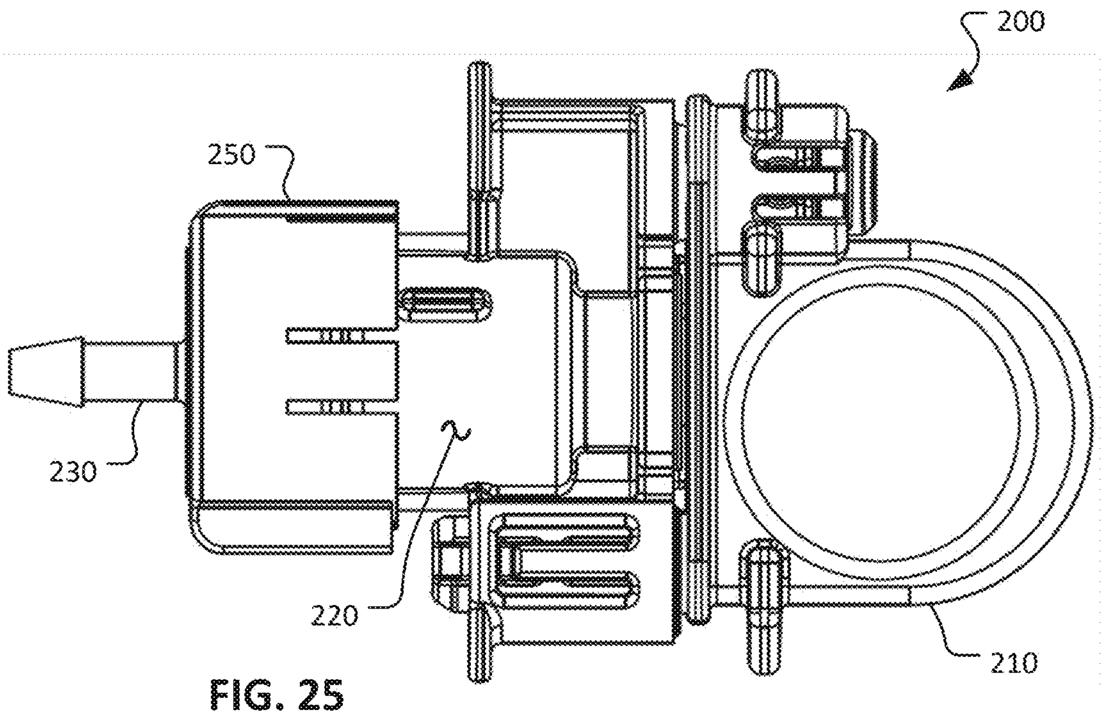
FIG. 25 is a top view of the fluid coupling of FIG. 22.
Figure 26:
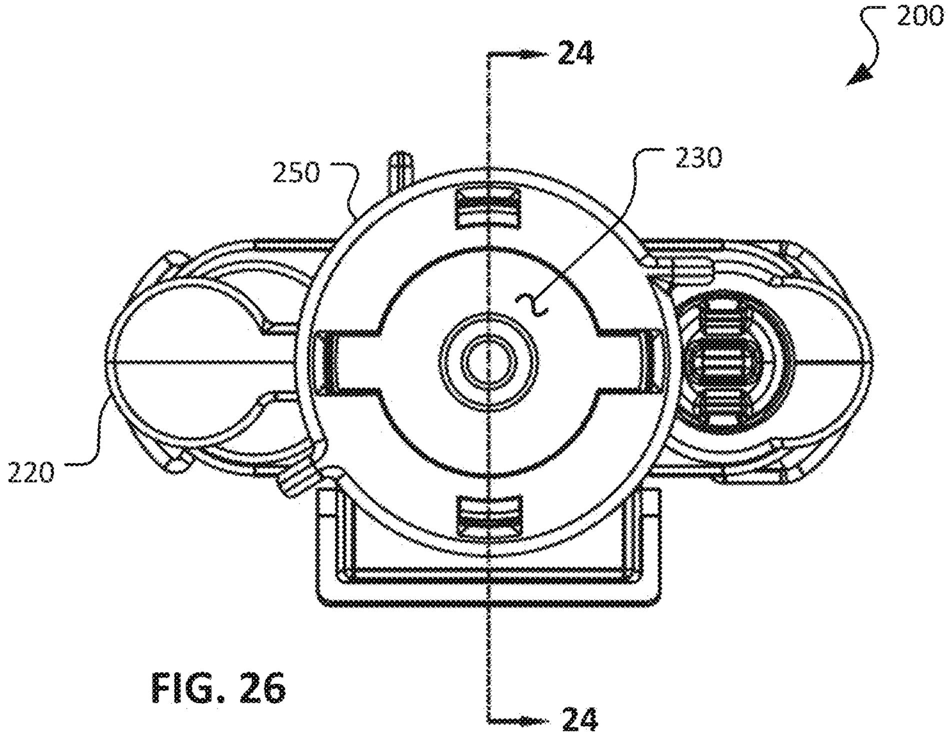
FIG. 26 is a front view of the fluid coupling of FIG. 22.
Figure 27:
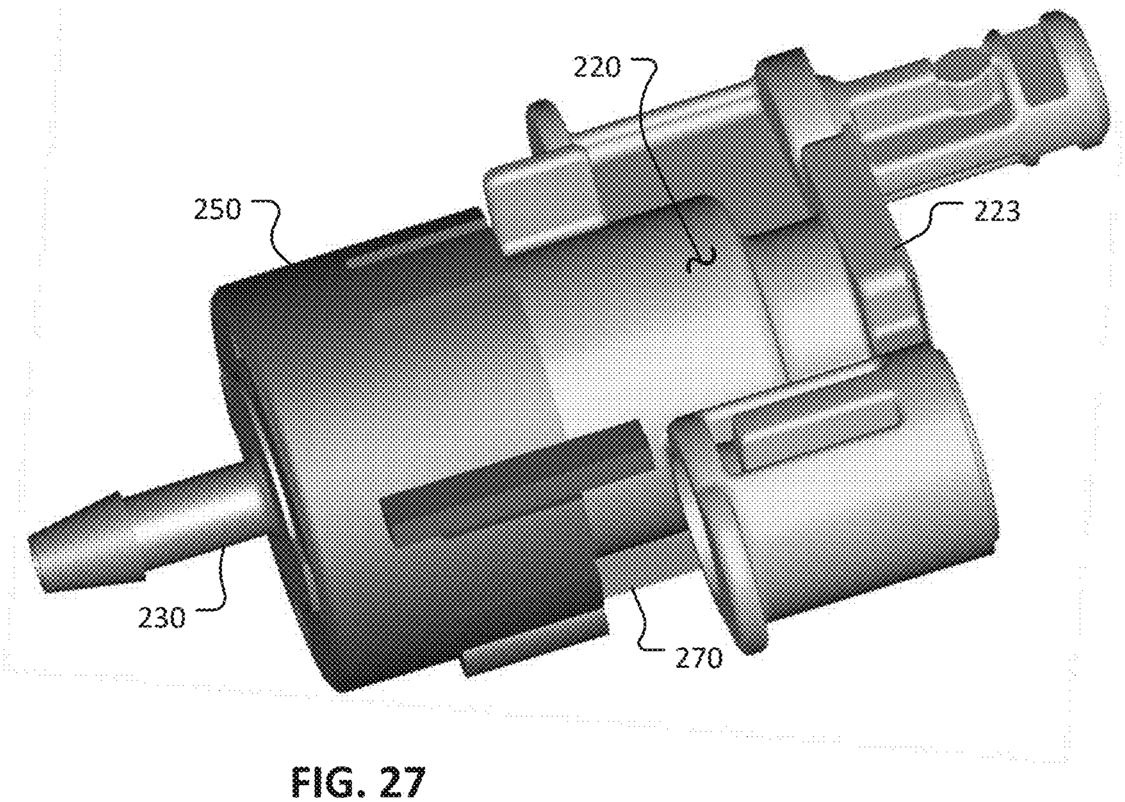
FIG. 27 is a perspective view of the fluid coupling of FIG. 22 with its protective cover removed.
Figure 28:
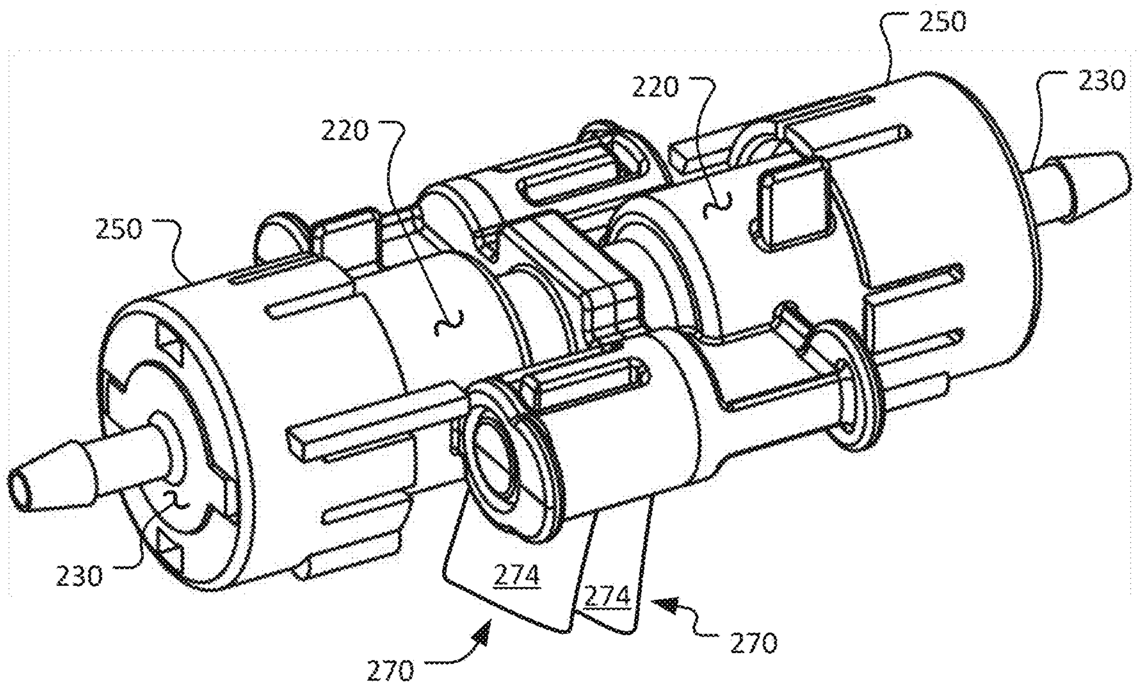
FIG. 28 is a perspective view of two fluid couplings of FIG. 22 that are coupled in a first pre-operative arrangement.
Figure 43:
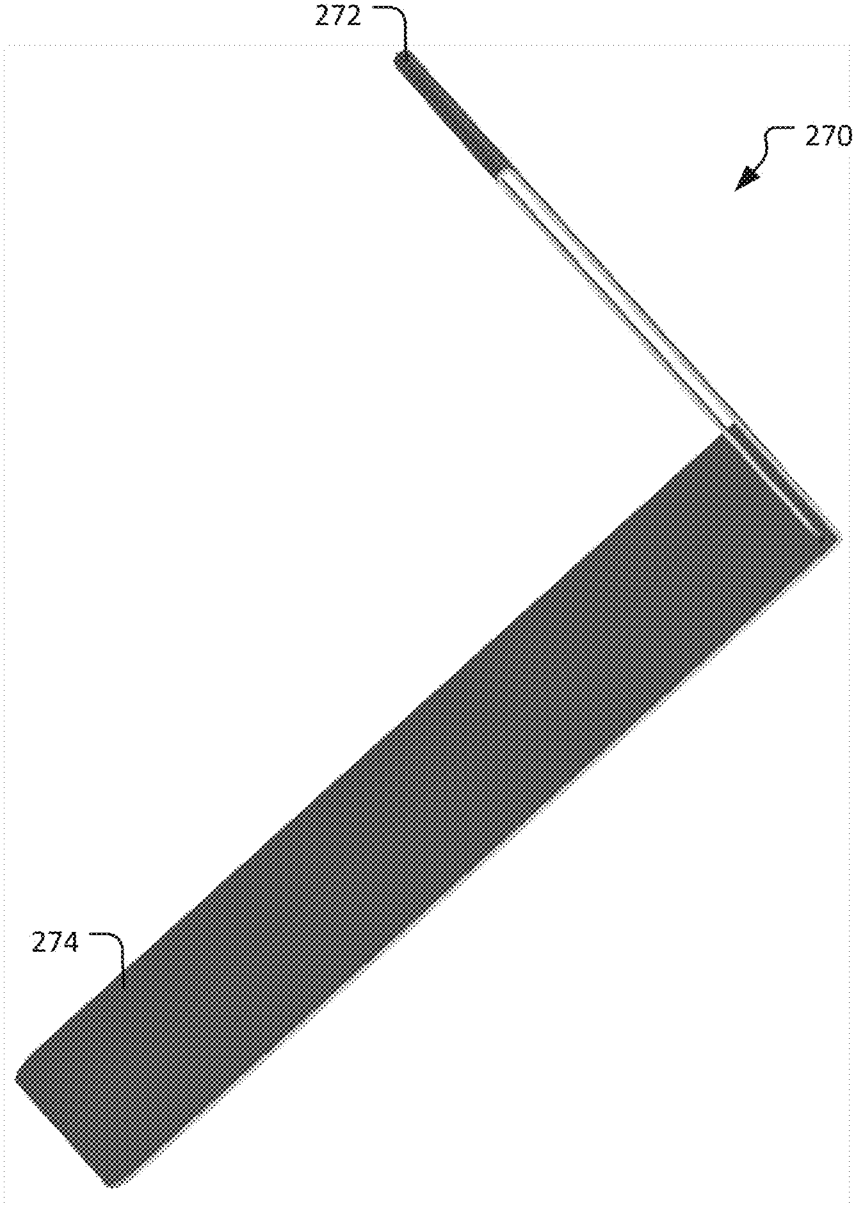
FIG. 43 is a perspective view of an example membrane of the fluid coupling of FIG. 22.

As shown in FIGS. 24 and 27, the membrane 270 (FIG. 43) is removably adhered (e.g., heat-staked, glued, etc.) to the front face 223 of the main body 220 to cover the seal portion projecting from the front face 223 and to maintain a sterility of a flow path of the fluid coupling 200. In addition to the portion of the membrane 270 that is attached to the front face 223 of the main body 220, the membrane 270 includes a fold 272 and a tail portion 274.

The valve actuator 250 is rotatably coupled to the main body 220. A user of the fluid coupling 200 can manually rotate the valve actuator 250 relative to the main body 220 (about the central longitudinal axis 221) to open/close the flow path through the fluid coupling 200 as described further below. The main body 220 and the valve actuator 250 include stop members 228 and 252 respectively that come into contact with each other to limit the rotation of the valve actuator 250 about the main body 220 when the valve member 240 is manually moved to its open position.

Figure 34:
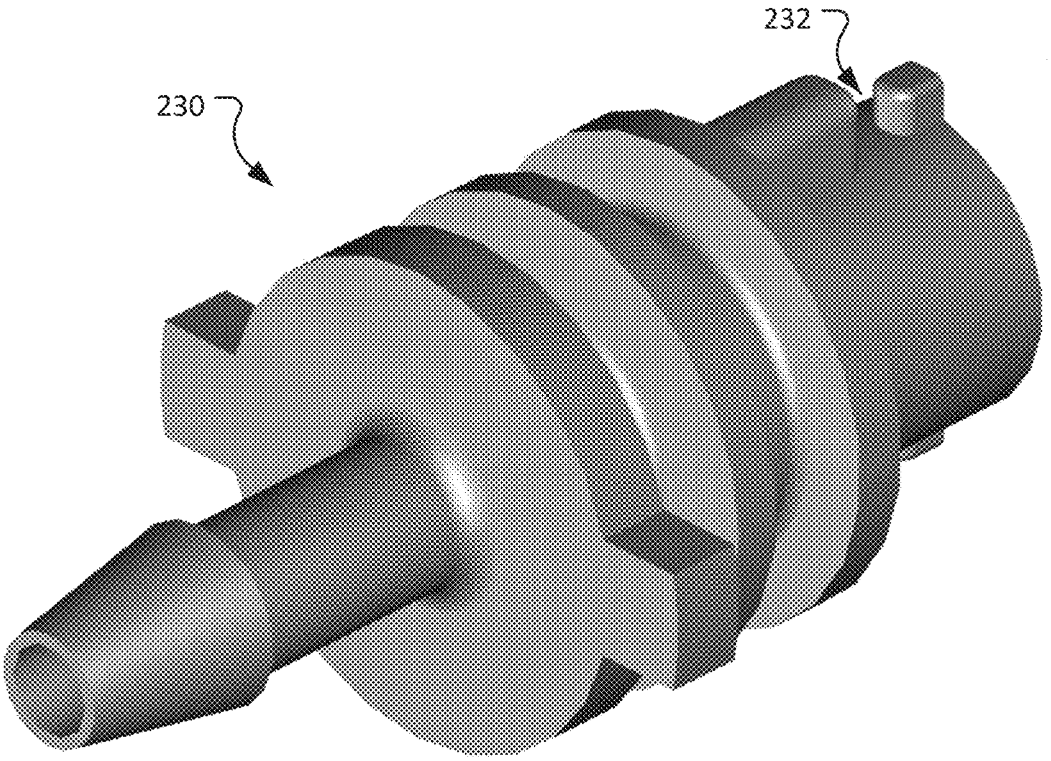
FIG. 34 is a perspective view of an example termination member of the fluid coupling of FIG. 22.
Figure 35:
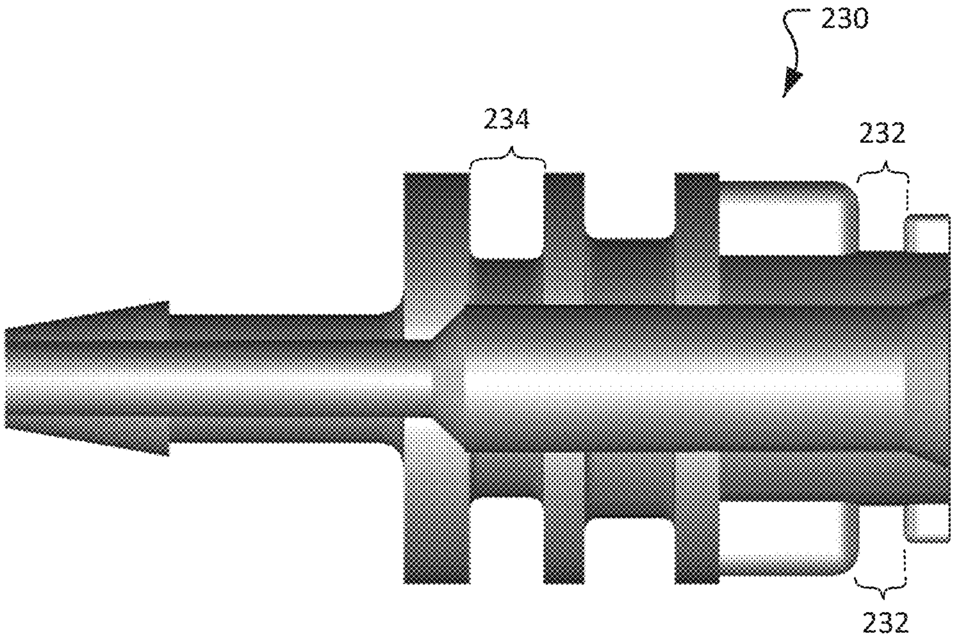
FIG. 35 is a longitudinal cross-section view of the termination member of FIG.

The termination member 230 is fixedly coupled to the valve actuator 250. The termination member 230 includes a fluid connector end (e.g., a hose barb fitting in this example, but can be any type of fluid connector) extending away from the main body 220 and an opposite end portion that is disposed within the internal space 222 of the main body 220. As shown in FIGS. 34 and 35, the opposite end portion of the valve actuator 250 that is disposed within the internal space 222 of the main body 220 defines a female thread groove 232.

Figure 40:
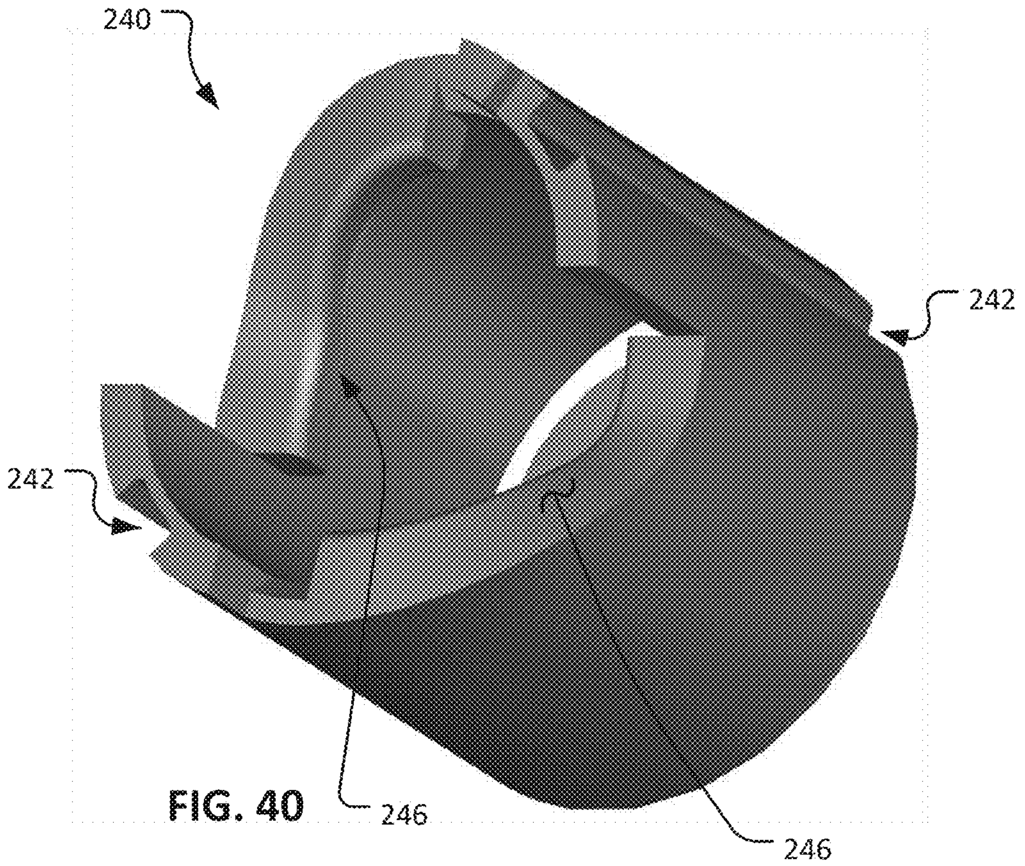
FIG. 40 is a perspective view of an example valve member of the fluid coupling of FIG. 22.
Figure 41:
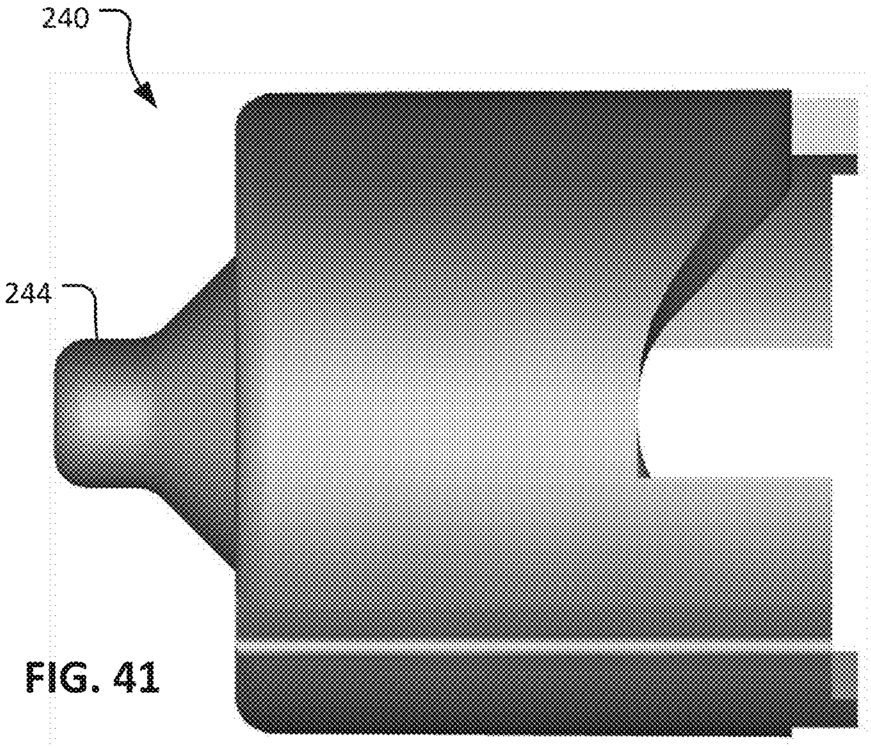
FIG. 41 is a side view of the valve member of FIG. 40.
Figure 42:
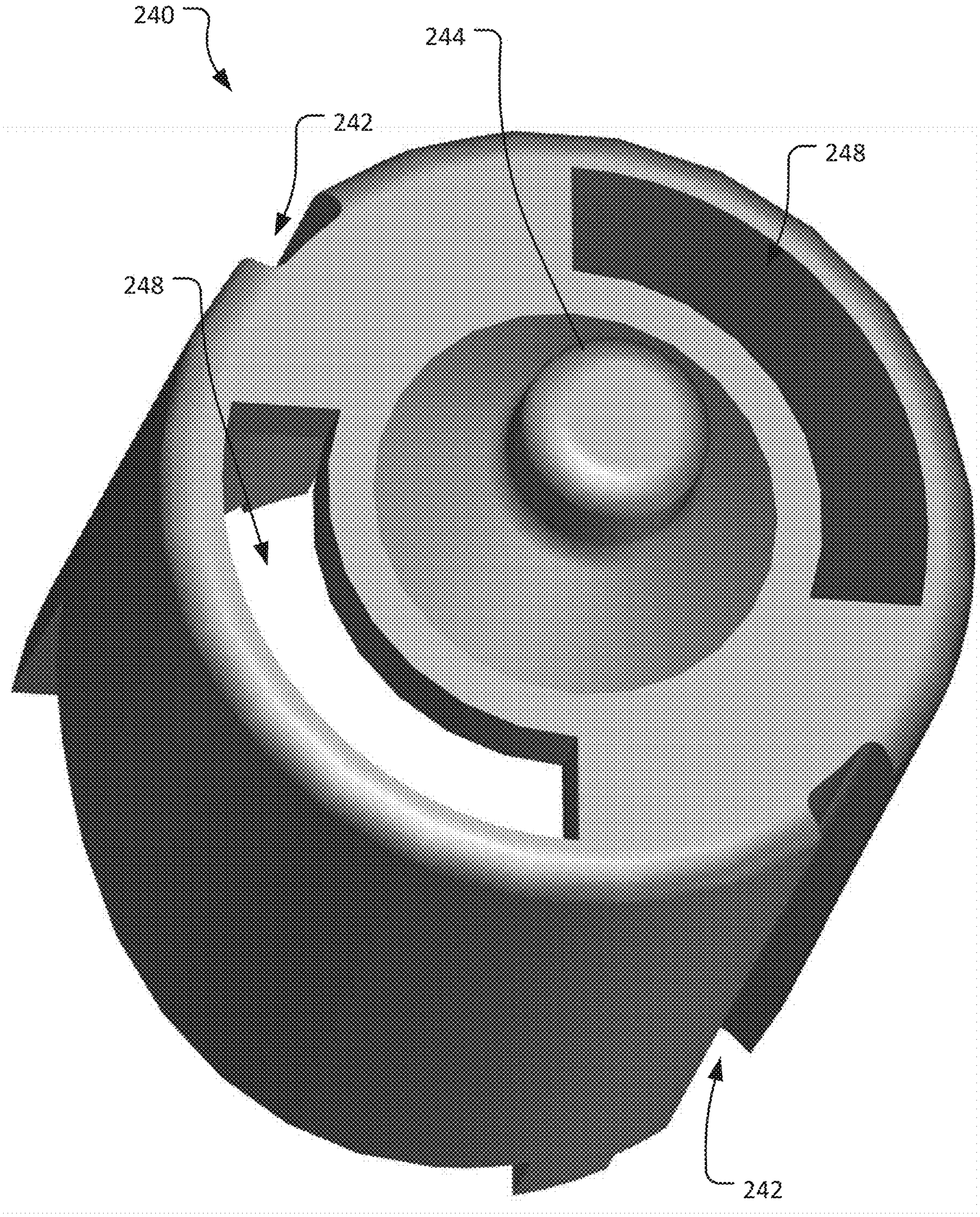
FIG. 42 is another perspective view of the valve member of FIG. 40.

The valve member 240, as also shown in FIGS. 40-42, is slidably translatable along the central longitudinal axis 221 within the internal space 222. The valve member 240 is physically prevented from rotating about the central longitudinal axis 221 because, in this non-limiting example, of the sliding engagement between a key 224 of the main body 220 that is engaged within a keyway 242 of the valve member 240.

The valve member 240 includes a screw thread segment 246 (which can be two of the thread segments 246, as in the depicted embodiment) that is slidably disposed in a corresponding thread groove 232 (or two thread grooves 232, as in the depicted embodiment) of the termination member 230. Accordingly, when a user rotates the valve actuator 250 about the main body 220, the termination member 230 is also rotated and the female thread groove 232 drives the valve member 240 to translate longitudinally within the internal space 222 because of the engagement between the female thread groove 232 and the screw thread segment 246 of the valve member 240.

The screw thread segment 246 of the valve member 240 includes end travel portions with less pitch than a pitch of a central portion of the screw thread segment 246. Accordingly, at the ends of travel (e.g., nearing and at the fully open position, and/or nearing and at the fully closed position) of the valve member 240, rotations of the valve actuator 250 cause less longitudinal movement than in the middle region of the travel of the valve member 240. In some embodiments, the end of travel portions include detents (e.g., snap detents) which require a little extra manual force to overcome (i.e., to make the valve member 240 move longitudinally from the fully open and/or fully closed positions).

Figure 29:
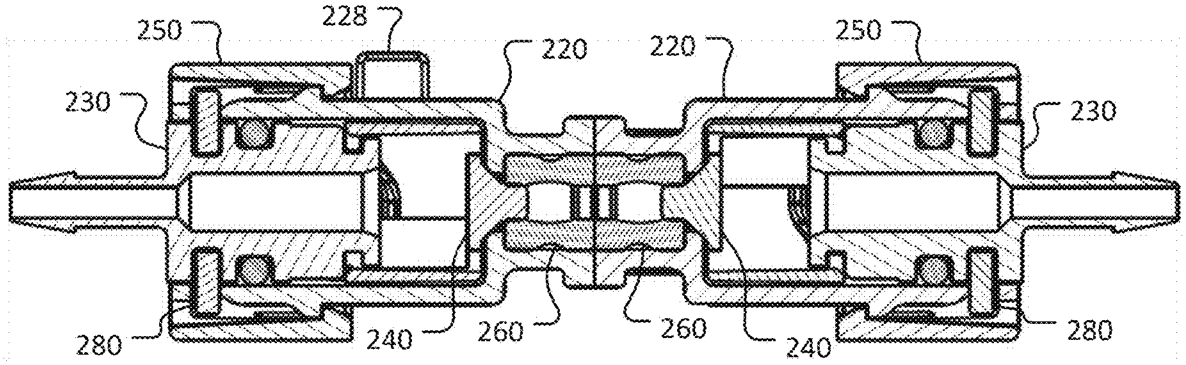
FIG. 29 is a longitudinal cross-section view of two fluid couplings of FIG. 22 that are coupled in a second pre-operative arrangement.
Figure 30:
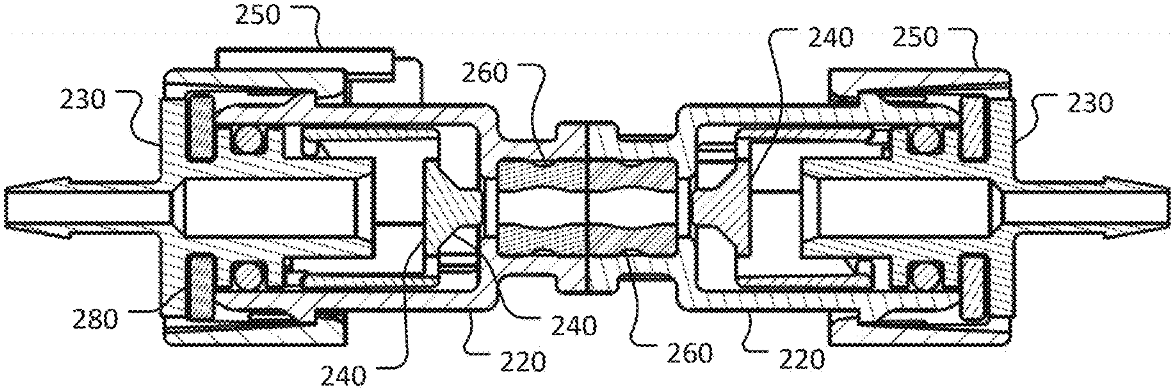
FIG. 30 is a longitudinal cross-section view of two fluid couplings of FIG. 22 that are coupled in an operative arrangement.
Figure 31:
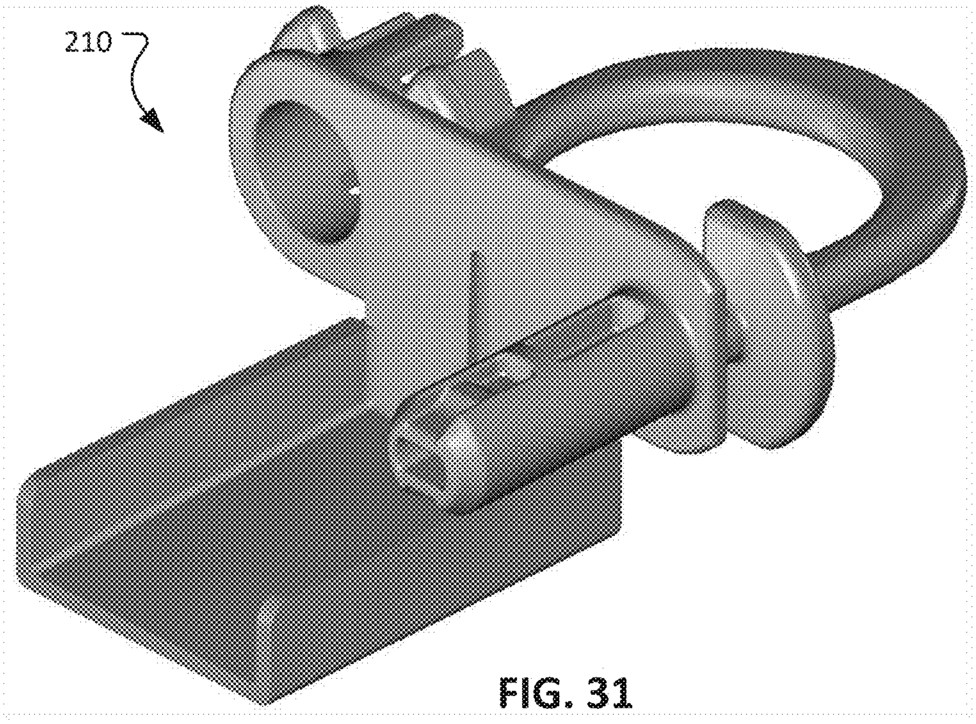
FIG. 31 is a perspective view of an example protective cover of the fluid coupling of FIG. 22.

The valve member 240 also includes a plug portion 244 that is sized to releasably engage within the central passageway of the seal 260 to create a fluid seal therebetween to block fluid flow through the seal 260 and through the fluid coupling 200 as a whole. Rotations of the valve actuator 250 can move the valve member 240 between a closed position (e.g., as shown in FIGS. 24 and 29) and an open position (e.g., as shown in FIG. 30). In some embodiments, the valve member 240 is configured to be moved a single time from the closed position to the open position (and to latch/lock in the open position). In some embodiments, the valve member 240 is configured to be moved a from the closed position to the open position and then back to the closed position a single time, or multiple times. In some embodiments, physical features are included whereby tactile or audible feedback is generated when the valve member 240 reaches its closed position and/or its open position. In some embodiments, rather than the plug portion 244 sealing in the inner diameter of the seal 260, other types of sealing arrangements are included (e.g., a face seal, a tapered face seal (similar to a poppet), etc., or a combination thereof).

In some embodiments, the valve member 240 is injection molded in a manner that prevents any mold process parting line from being on the plug portion 244. Better sealing between the seal 260 and the valve member 240 can be advantageously facilitated by the lack of an injection mold parting line on the plug portion 244.

The protective cover 210 is removably coupled to the main body 220 to thereby cover and protect the membrane 270 while the membrane 270 is attached to the main body 220. The protective cover 210 includes a post and a post receptacle that are releasably coupled with a post receptacle of the main body 220 and a post of the main body respectively. The post and the post receptacle of the main body 220 each extend parallel to the central longitudinal axis 221 and are coplanar with the central longitudinal axis 221.

In preparation for operatively joining/engaging two of the fluid couplings 200 together, first the protective covers 210 are removed from each of the fluid couplings 200. Then, the user can align the post and the post receptacle of the first main body 220 with the post receptacle and the post of the second main body 220. Then the user can longitudinally snap the two couplings 200 together (e.g., see FIG. 28) in an arrangement that is irreversible, i.e., the main bodies 220 are thereafter undetachable from each other (without incurring damage to the fluid couplings 200). However, in some embodiments the main bodies 220 can be detachable from each other.

When two of the fluid couplings 200 are snaped together (e.g., FIG. 28) then a user can grasp the tail portions 274 of the membranes 270 and pull them transversely off of the main bodies 220 (e.g., see end result of removing the membranes 270 in FIG. 29). During that process of pulling the membranes 270, the folds 272 of the membranes 270 roll in the direction of the pulling force until the membranes 270 become completely removed from the front faces 223 of the main bodies 220. With the membranes 270 removed, the seals 260 of the fluid couplings 220 abut directly against each other in a fluid-sealed and aseptic arrangement. Then the valves 240 can be moved to their open positions (as shown in FIG. 30) to open a sterile fluid flow path through the two couplings 200. Fluid can then flow through openings 248 (e.g., FIG. 42) that are defined by front faces of the valve member 240. In the depicted embodiment, the openings 248 are two arcuate shaped openings, without limitation.

Figure 36:
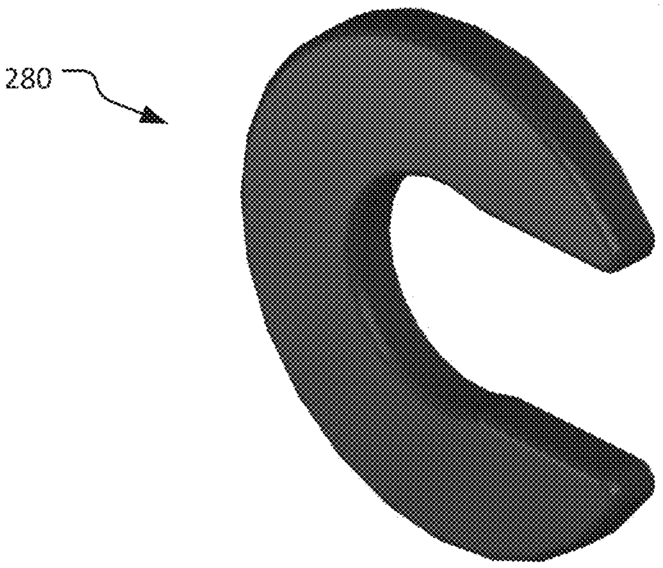
FIG. 36 is a perspective view of an example C-clip of the fluid coupling of FIG. 22.
Figure 37:
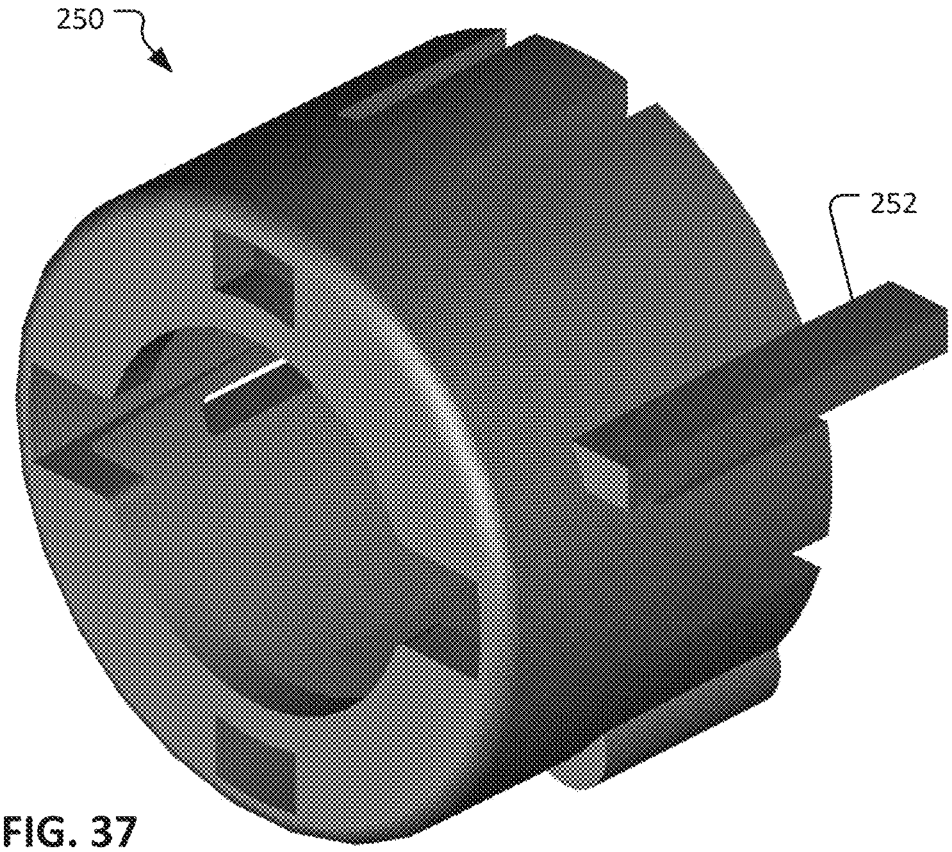
FIG. 37 is a perspective view of an example valve actuator of the fluid coupling of FIG. 22.
Figure 38:
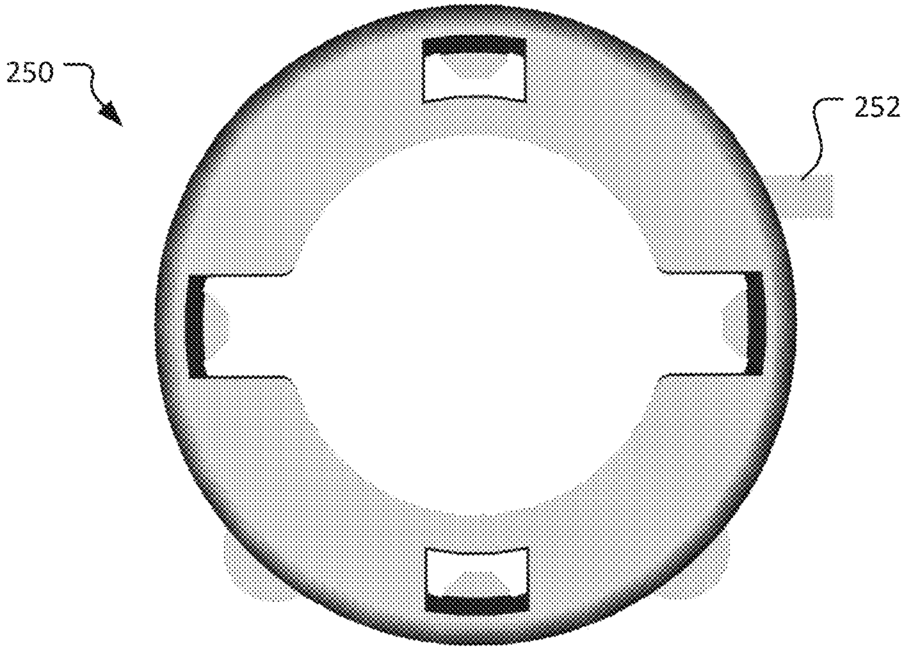
FIG. 38 is a front view of the valve actuator of FIG. 37.
Figure 39:
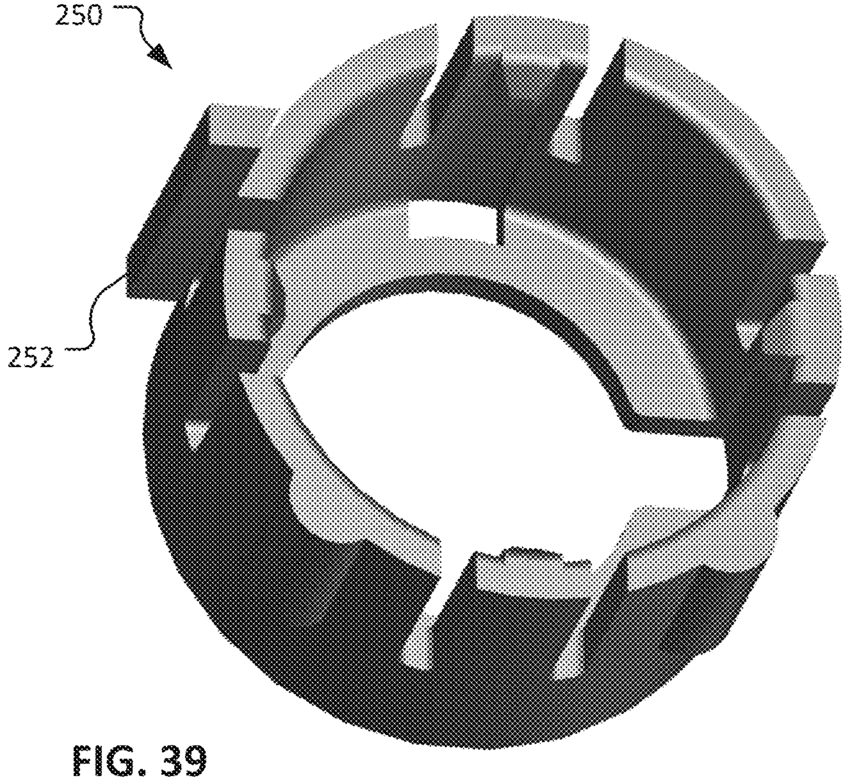
FIG. 39 is another perspective view of the valve actuator of FIG. 37.

The fluid coupling 200 also includes the C-clip 280 (e.g., see FIG. 36). The C-clip 280 is engaged/snapped in a groove 234 (e.g., FIG. 35) defined by the termination member 230 and resides between the main body 220 and the valve actuator 250 (e.g., see FIGS. 24, 29, and 30). The C-clip 280 maintains the longitudinal position of the termination member 230 and the valve actuator 250 relative to the main body 220.

Figure 44:
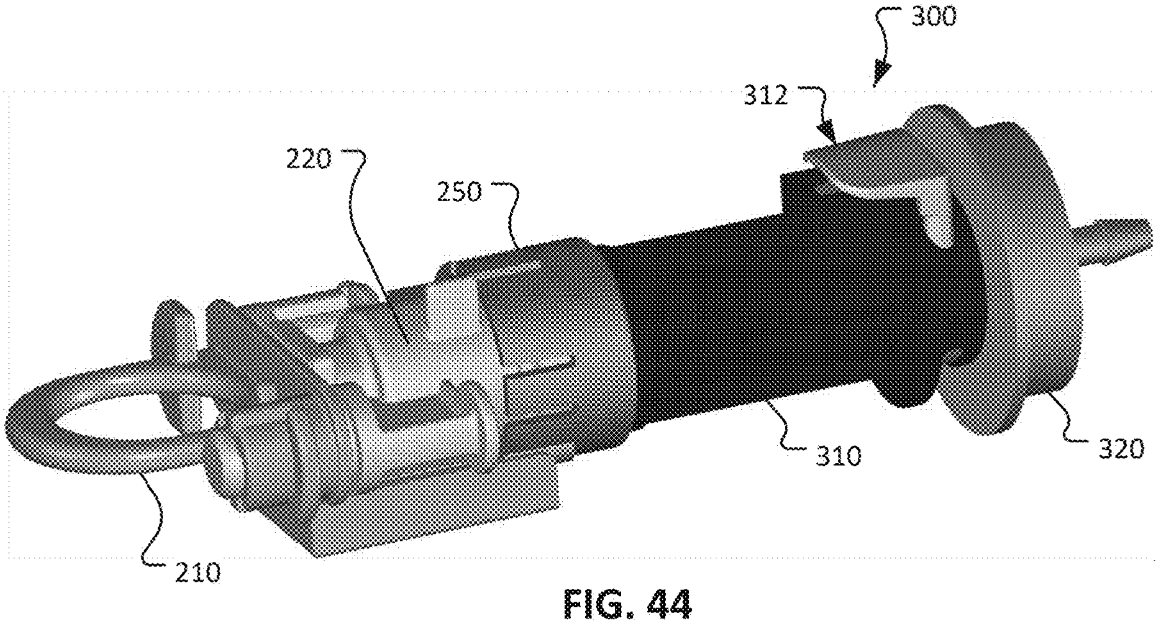
FIG. 44 is a perspective view of an example fluid coupling that includes a reservoir in accordance with some embodiments.
Figure 45:
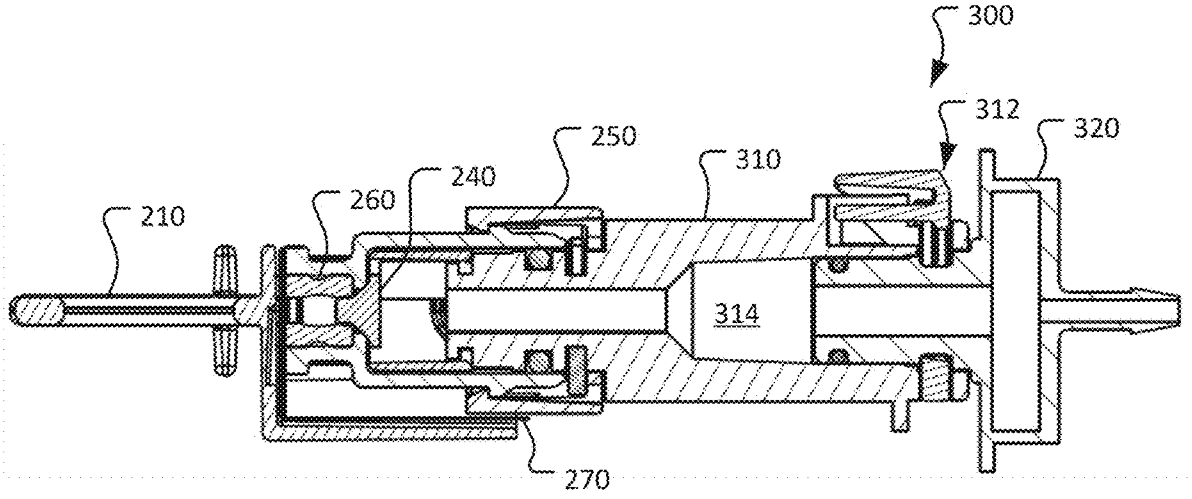
FIG. 45 is a longitudinal cross-section view of the fluid coupling of FIG. 44.

As shown in FIGS. 44 and 45, in some embodiments a reservoir 300 can be coupled between coupled between the main body 220 and a termination member 320 (which can be configured in many ways as alternatives to the hose barb fitting shown, including configuration as a plug and other types of fluid connections). In some such embodiments, the reservoir 300 can be used as a means of dispensing reagents. In the depicted embodiment, the reservoir 300 includes an optional latch mechanism 312 by which access to an internal space 314 of the reservoir 300 can be obtained. The latch mechanism 312 allows a user to remove the termination member 320 from its engagement with the reservoir body 310.

With a fluid substance in the internal space 314 of the reservoir 300, once the valve member 240 is open, the liquid can flow through the main body 220 and valve member 240. In some cases, an air supply/pressure can be attached to the termination member 320 to help purge the flow path, i.e., to get all of the fluid substance out of the flow path. In some cases, the air could thereby also be used to drive the fluid substance through a line coupled to the arrangement shown in FIGS. 44 and 45.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. A fluid coupling device comprising:

a main body defining a central longitudinal axis, a seal recess, and an internal space, the main body comprising a front face;

a seal comprising a seal portion disposed within the seal recess and a seal portion projecting from the front face, the seal defining a longitudinally-extending central passageway;

a membrane removably adhered to the front face and covering the seal portion projecting from the front face;

a valve actuator rotatably coupled to the main body;

a termination member fixedly coupled to the valve actuator, the termination member comprising a fluid connector end extending away from the main body and an opposite end portion that is disposed within the internal space and that defines a thread groove; and a valve member slidably translatable along the central longitudinal axis within the internal space, the valve member being prevented from rotating about the central longitudinal axis, the valve member comprising: (i) a screw thread segment slidably disposed in the thread groove of the termination member and (ii) a plug portion that is sized to engage within the central passageway of the seal to block fluid flow therethrough.

2. The fluid coupling device of claim 1, wherein the main body further comprises a post and a post receptacle that each extend parallel to the central longitudinal axis.

3. The fluid coupling device of claim 2, further comprising a protective cover comprising a post and a post receptacle that are releasably coupled with the post receptacle of the main body and the post of the main body respectively, the protective cover arranged to cover the front face of the main body when the protective cover is coupled to the main body.

4. The fluid coupling device of claim 1, further comprising a C-clip engaged within a clip groove defined by the termination member and disposed between the valve actuator and an end surface of the main body.

5. The fluid coupling device of claim 1, wherein the membrane, while adhered to the front face, maintains sterility of the internal space.

6. The fluid coupling device of claim 1, wherein the fluid coupling device is configured to be coupled to a second fluid coupling device of a same design in order to create an aseptic fluid connection between the termination member and a second termination member of the second fluid coupling device.

7. The fluid coupling device of claim 6, wherein the fluid coupling device and the second fluid coupling device cannot be unconnected from each other without inducing damage thereto.

8. The fluid coupling device of claim 1, wherein the main body and the valve actuator include stop members to limit the rotation of the valve actuator about the main body.

9. The fluid coupling device of claim 1, wherein the valve member is configured to be moved a single time from a closed position to an open position.

10. The fluid coupling device of claim 1, wherein the valve member is configured to be moved from a closed position to an open position and then back to the closed position.

11. The fluid coupling device of claim 1, wherein rotations of the valve actuator positively control a position of the valve member within the internal space.

12. The fluid coupling device of claim 1, wherein the main body further comprises a post and a post receptacle that each extend parallel to the central longitudinal axis, and wherein an axis of the post, an axis of the post receptacle, and the central longitudinal axis are coplanar with each other.

13. The fluid coupling device of claim 1, wherein the screw thread segment of the valve member includes end travel portions with less pitch than a pitch of a central portion of the screw thread segment.

14. The fluid coupling device of claim 13, wherein the end travel portions include detents.

15. The fluid coupling device of claim 1, wherein the plug portion is free from a molding parting line.

16. The fluid coupling device of claim 1, further comprising a reservoir coupled between the main body and the termination member.

* * * * *